(12) United States Patent
Diehl et al.

(10) Patent No.: US 11,385,384 B2
(45) Date of Patent: Jul. 12, 2022

(54) SPOKE DIELECTRIC LENS

(71) Applicant: The Boeing Company, Chicago, IL (US)

(72) Inventors: Colin Anthony Minor Diehl, Huntsville, AL (US); Corey McKinney Thacker, Madison, AL (US)

(73) Assignee: The Boeing Company, Chicago, IL (US)

(*) Notice: Subject to any disclaimer, the term of this patent is extended or adjusted under 35 U.S.C. 154(b) by 148 days.

(21) Appl. No.: 15/930,402

(22) Filed: May 12, 2020

(65) Prior Publication Data

US 2021/0356629 A1 Nov. 18, 2021

(51) Int. Cl.
*G02B 3/00* (2006.01)
*H01Q 15/08* (2006.01)
*H01Q 15/10* (2006.01)

(52) U.S. Cl.
CPC ............ *G02B 3/0087* (2013.01); *H01Q 15/08* (2013.01); *H01Q 15/10* (2013.01); *G02B 2003/0093* (2013.01)

(58) Field of Classification Search
CPC .......... G02B 3/0087; G02B 2003/0093; H01Q 3/44; H01Q 15/08; H01Q 15/10
USPC .................................. 359/652–654
See application file for complete search history.

(56) References Cited

U.S. PATENT DOCUMENTS 2,677,766 A 4/1949 Litchford
2,866,971 A * 12/1958 Kelleher ................ H01Q 15/23
342/11
3,133,285 A * 5/1964 Jordan ................... H01Q 15/08
359/664
3,404,405 A 10/1968 Young
4,232,321 A 11/1980 Ohm
(Continued)

FOREIGN PATENT DOCUMENTS

EP 2573872 A1 3/2013
EP 2750246 A1 7/2014
(Continued)

OTHER PUBLICATIONS

S. Rondineau, M. Himdi and J. Sorieux, "A sliced spherical Luneburg lens," in IEEE Antennas and Wireless Propagation Letters, vol. 2, pp. 163-166, 2003, doi: 10.1109/LAWP.2003.819045 (Year: 2003).*
(Continued)

*Primary Examiner* — Zachary W Wilkes
(74) *Attorney, Agent, or Firm* — Haynes and Boone, LLP

(57) ABSTRACT

A dielectric lens is disclosed comprising a center portion that extends along a cylinder having a central axis and a plurality of spoke portions that are attached to the center portion and extend to a spherical perimeter region in a radial direction from the center portion. The plurality of spoke portions includes at least a first monolithic spoke portion extending from the center portion to the spherical perimeter region and the center portion and the plurality of spoke portions define a plurality of cavity regions among the plurality of spoke portions. The center portion, the cylinder, the plurality of spoke portions, and the plurality of cavity regions are included in a gradient index (GRIN) dielectric lens having a plurality of relative permittivities that are based on a radial distance from the center portion.

24 Claims, 17 Drawing Sheets

(56) References Cited

U.S. PATENT DOCUMENTS

| | | | |
|---|---|---|---|
| 5,218,322 | A | 6/1993 | Allison et al. |
| 5,677,796 | A * | 10/1997 | Zimmerman ............ H01Q 15/08 359/720 |
| 7,385,462 | B1 | 6/2008 | Epp et al. |
| 9,437,184 | B1 | 9/2016 | Swett |
| 9,979,459 | B2 | 5/2018 | Savage et al. |
| 10,291,312 | B2 | 5/2019 | Savage et al. |
| 10,746,903 | B2 * | 8/2020 | Diehl .................... G02B 3/0087 |
| 10,886,613 | B2 * | 1/2021 | Jesme ..................... H01Q 3/44 |
| 11,043,743 | B2 * | 6/2021 | Yang ...................... H01Q 15/10 |
| 11,050,158 | B2 * | 6/2021 | Nishida ................ B29C 64/106 |
| 2003/0006941 | A1 | 1/2003 | Ebling et al. |
| 2003/0043086 | A1 | 3/2003 | Schaffner et al. |
| 2006/0098272 | A1 | 5/2006 | Lerner et al. |
| 2007/0216596 | A1 | 9/2007 | Lewis et al. |
| 2016/0322703 | A1 * | 11/2016 | Jesme .................... B29C 64/106 |
| 2019/0086581 | A1 | 3/2019 | Diehl et al. |
| 2020/0083612 | A1 | 3/2020 | Diehl et al. |

FOREIGN PATENT DOCUMENTS

| | | |
|---|---|---|
| EP | 3012916 A1 | 4/2016 |
| WO | 2015102938 A1 | 7/2015 |

OTHER PUBLICATIONS

Ma, H., Cui, T. Three-dimensional broadband and broad-angle transformation-optics lens. NatCommun 1, 124 (2010). https://doi.org/10.1038/ncomms1126 (Year: 2010).*

A. Sayanskiy, S. Glybovski, V. P. Akimov, D. Filonov, P. Belov and I. Meshkovskiy, "Broadband 3-D Luneburg Lenses Based on Metamaterials of Radially Diverging Dielectric Rods," in IEEE Antennas and Wireless Propagation Letters, vol. 16, pp. 1520-1523, 2017, doi: 10.1109/LAWP.2016.2647383 (Year: 2017).*

Jin Chen, Xujin Yuan, Mingji Chen, Xiaodong Cheng, Anxue Zhang, Gantao Peng, Wei-Li Song, and Daining Fang; ACS Applied Materials & Interfaces 2018 10 (44), 38404-38409; DOI: 10.1021/acsami.8b11239 (Year: 2018).*

Zhang et al., "3D-printed flat lens for microwave applications", IEEE Xplore Documents, Nov. 2-3, 2015, 3 pages.

Schoenlinner, Bernhard, "Wide-Scan Spherical-Lens Antennas for Automotive Radars," IEEE Transactions on Microwave theory and Techniquest, vol. 50, No. 9, Sep. 2002, pp. 2166-2175.

Allen et al., "Design and fabrication of an RF GRIN lens 3D printing technology", Proc. of SPIE, vol. 8624, Feb. 20, 2013, 8 pgs.

Delgado et al., "Scanning Properties of Teflon Lenses," Microwave and Optical Technology Letters, vol. 11, No. 5, Apr. 5, 1996, pp. 271-273.

Tribe et al., "Additively manufactured hetrogeneous substrates for three-dimensional control of permittivity," Electronics Letters, May 8, 2014; vol. 50, No. 10, pp. 745-746.

Jain et al., "Flat-Base Broadband Multibeam Luneburg Lens for Wide Angle Scan," Cornell University, May 4, 2013, arXiv.org > physics > arXiv:1305.0964, pp. 1-15.

Schoenlinner, Bernhard, "Compact Wide Scan-Angle Antennas for Automotive Applications and RF MEMS. Switchable Frequency-Selective Surfaces," A dissertation submitted in partial fulfillment of the requirements for the degree of Doctor of Philosophy, The University of Michigan, 2004, 190 pages.

* cited by examiner

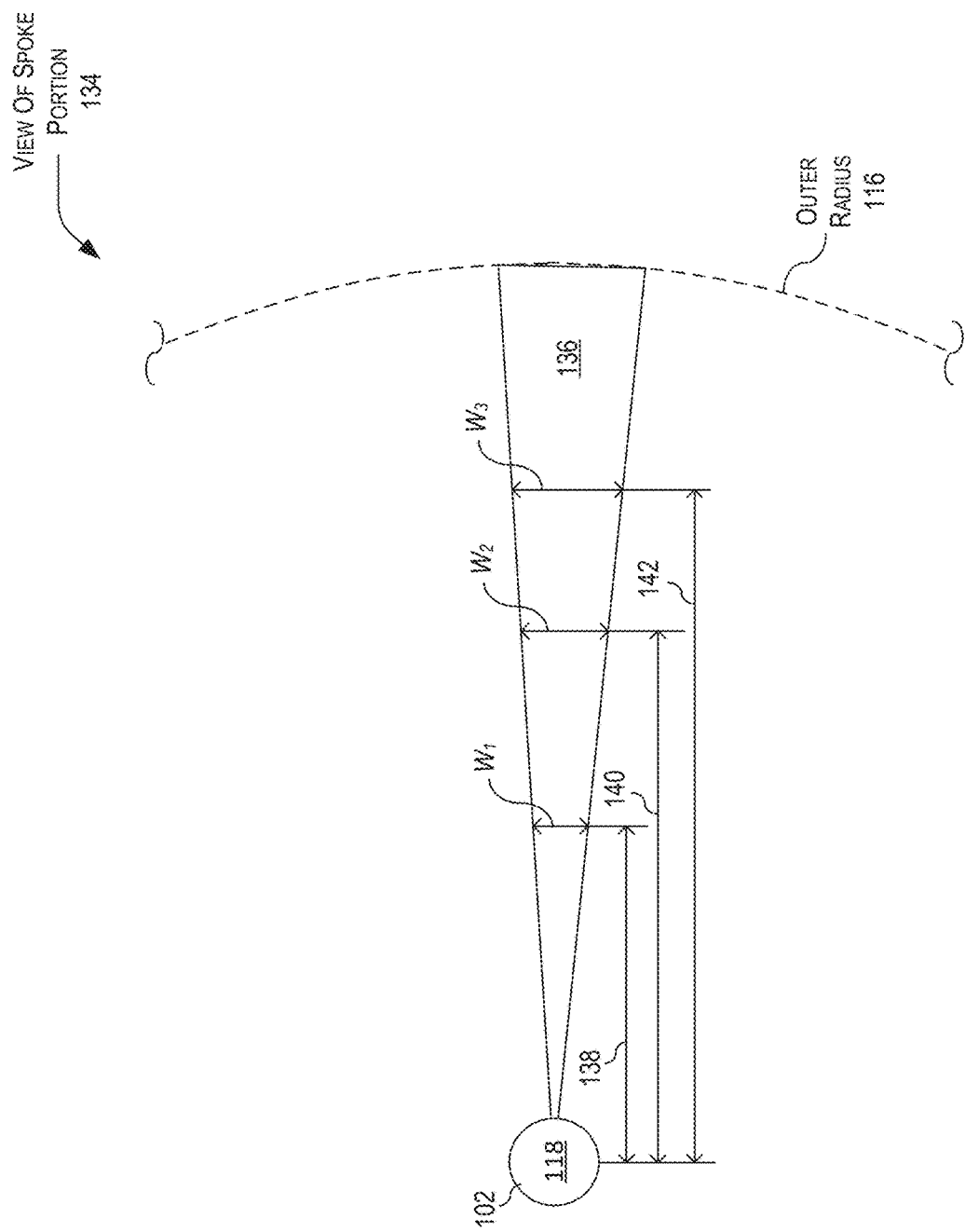

SPOKE DIELECTRIC LENS

BACKGROUND

1. Technical Field

The field of the invention relates generally to antenna systems, and more specifically, to dielectric lenses for antenna systems.

2. Prior Art

Electronic devices utilize antennas to communicate using electromagnetic (EM) signals. In general, data may be represented using an EM signal, and the EM signal may be provided from an antenna of a first electronic device to an antenna of another electronic device via wireless transmission.

In general, for long distance communication, an EM signal from an antenna may be focused using a reflector antenna (e.g., a parabolic dish), an antenna array, or a dielectric lens antenna, such as a gradient index (GRIN) dielectric lens. Typically, a reflector antenna, antenna array, or dielectric lens antenna may be heavy and large, which may cause mobility problems and increase cost. However, reducing the size of a reflector antenna, antenna array, or a dielectric lens antenna may reduce the gain of the transmitted EM signal, which will degrade signal quality of wireless transmission. As such, there is a need for a cost-effective advanced antenna design that addresses these issues.

SUMMARY

A spoke dielectric lens is disclosed that comprises a center portion that extends along a cylinder having a central axis and a plurality of spoke portions that are attached to the center portion and extend to a spherical perimeter region in a radial direction from the center portion. The plurality of spoke portions includes at least a first monolithic spoke portion extending from the center portion to the spherical perimeter region and the center portion and the plurality of spoke portions define a plurality of cavity regions among the plurality of spoke portions. The center portion, the cylinder, the plurality of spoke portions, and the plurality of cavity regions are included in a gradient index (GRIN) lens having a plurality of relative permittivities that are based on a radial distance from the center portion.

Also disclosed is a spoke dielectric lens comprising a center portion that extends along a cylinder having a central axis and a plurality of spoke layers. Each spoke layer of the plurality of spoke layers is attached to another spoke layer of the plurality of spoke layers in a stack-up fashion along the cylinder and each spoke layer comprises a plurality of spoke portions that are attached to the cylinder and extend to a spherical perimeter region in a radial direction from the cylinder. The plurality of spoke portions includes at least a first monolithic spoke portion extending from the cylinder to the spherical perimeter region. The cylinder and the plurality of spoke portions define a plurality of cavity regions among the plurality of spoke portions. The cylinder, the plurality of spoke portions, and the plurality of cavity regions are included in a GRIN lens having a plurality of relative permittivities that are based on a radial distance from the center portion.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 1E is an expanded view of a spoke portion of the spoke dielectric lens in accordance with the present disclosure.

DETAILED DESCRIPTION

Disclosed is a spoke dielectric lens. The spoke dielectric lens comprises a center portion that extends along a cylinder having a central axis and a plurality of spoke portions that are attached to the center portion and extend to a spherical perimeter region in a radial direction from the center portion. The plurality of spoke portions includes at least a first monolithic spoke portion extending from the center portion to the spherical perimeter region and the center portion and the plurality of spoke portions define a plurality of cavity regions among the plurality of spoke portions. The center portion, the cylinder, the plurality of spoke portions, and the plurality of cavity regions are included in a gradient index (GRIN) lens having a plurality of relative permittivities that are based on a radial distance from the center portion.

Also disclosed is a spoke dielectric lens comprising a center portion that extends along a cylinder having a central axis and a plurality of spoke layers. Each spoke layer is attached to another spoke layer of the plurality of spoke layers in a stack-up fashion along the cylinder and each spoke layer comprises a plurality of spoke portions that are attached to the cylinder and extend to a spherical perimeter region in a radial direction from the cylinder. The plurality of spoke portions includes at least a first monolithic spoke portion extending from the cylinder to the spherical perimeter region and the cylinder and the plurality of spoke portions define a plurality of cavity regions among the plurality of spoke portions. The cylinder, the plurality of spoke portions, and the plurality of cavity regions are included in the GRIN lens having a plurality of relative permittivities that are based on a radial distance from the center portion.

In this disclosure, the disclosed spoke dielectric lens may be a spherical or hemispherical GRIN dielectric lens that include, for example, a Luneburg, fisheye lens, or Maxwell fisheye lens.

Figure 1A:
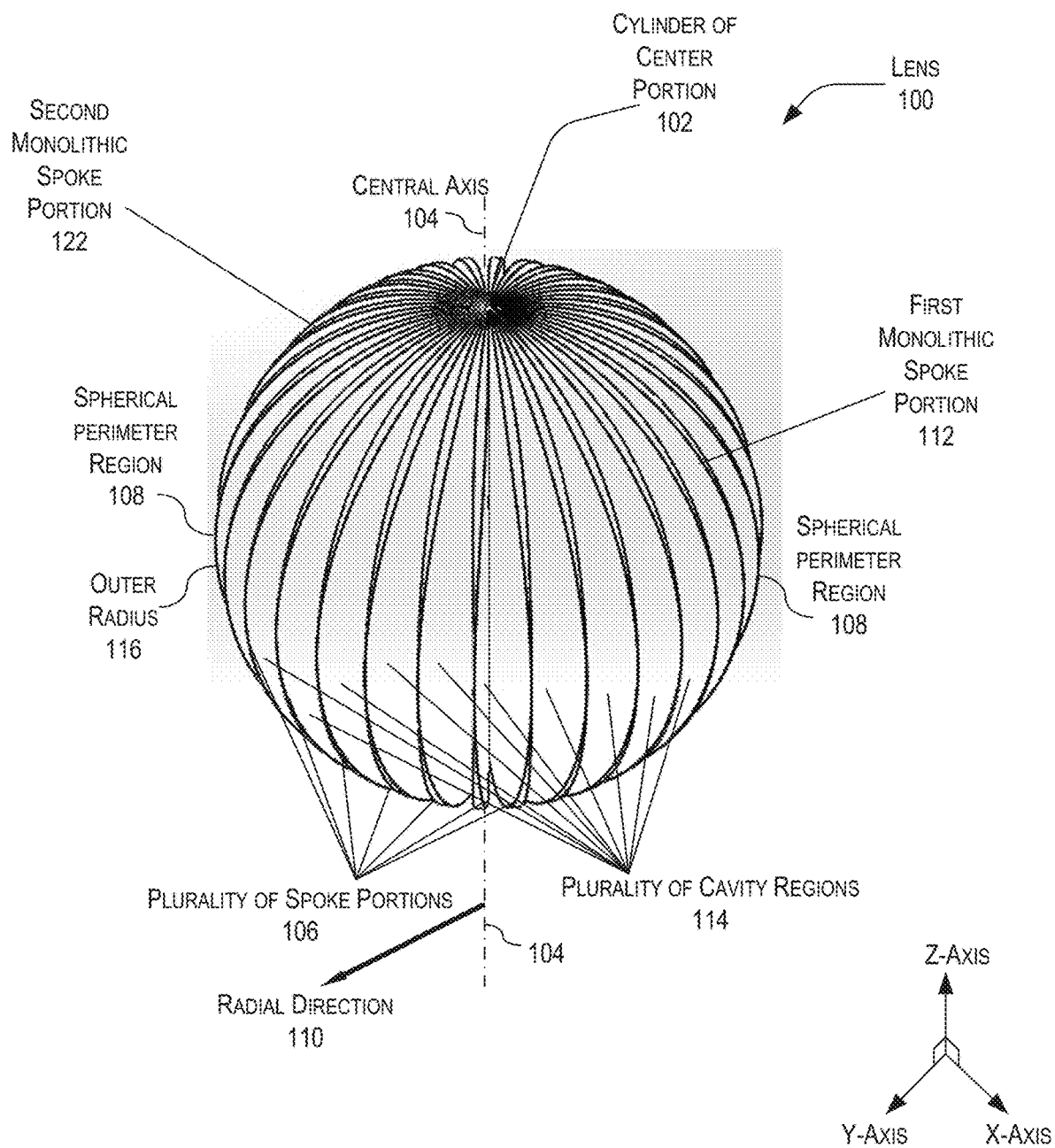
FIG. 1A is a perspective view of an example of an implementation of a spoke dielectric lens in accordance with the present disclosure.

In FIG. 1A, a perspective view of an example of an implementation of a spoke dielectric lens 100 is shown in accordance with the present disclosure. The spoke dielectric lens 100 includes a cylinder 102 of a center portion along a central axis 104 and a plurality of spoke portions 106 that are attached to the cylinder 102 of the center portion and extend to a spherical perimeter region 108 in a radial direction 110 from the cylinder 102 of the center portion. In this example, the plurality of spoke portions 106 includes at least a first monolithic spoke portion 112 extending from the cylinder 102 of the center portion to the spherical perimeter region 108 and the cylinder 102 of the center portion and the plurality of spoke portions 106 define a plurality of cavity regions 114 among the plurality of spoke portions 106. As used herein, the term "monolithic" spoke portion refers to a spoke portion that includes a contiguous region including at least some material forming an approximate straight line. The center portion, the cylinder 102, the plurality of spoke portions 106, and the plurality of cavity regions 114 are included in a GRIN spoke dielectric lens having a plurality of relative permittivities that are based on a radial distance from the center portion.

In this example, the central axis 104 is shown as aligned with a Z-axis while each of the spoke portions of the plurality of spoke portions 106 are shown as extending outward in the radial direction 110 along an X-axis or Y-axis normal to the central axis 104. The spherical perimeter region 108 is located at an outer radius 116 of the spoke dielectric lens 100, where the outer radius is at a maximum radial distance ($R_{max}$) of a radius extending from the center portion to the spherical perimeter region 108.

Figure 1B:
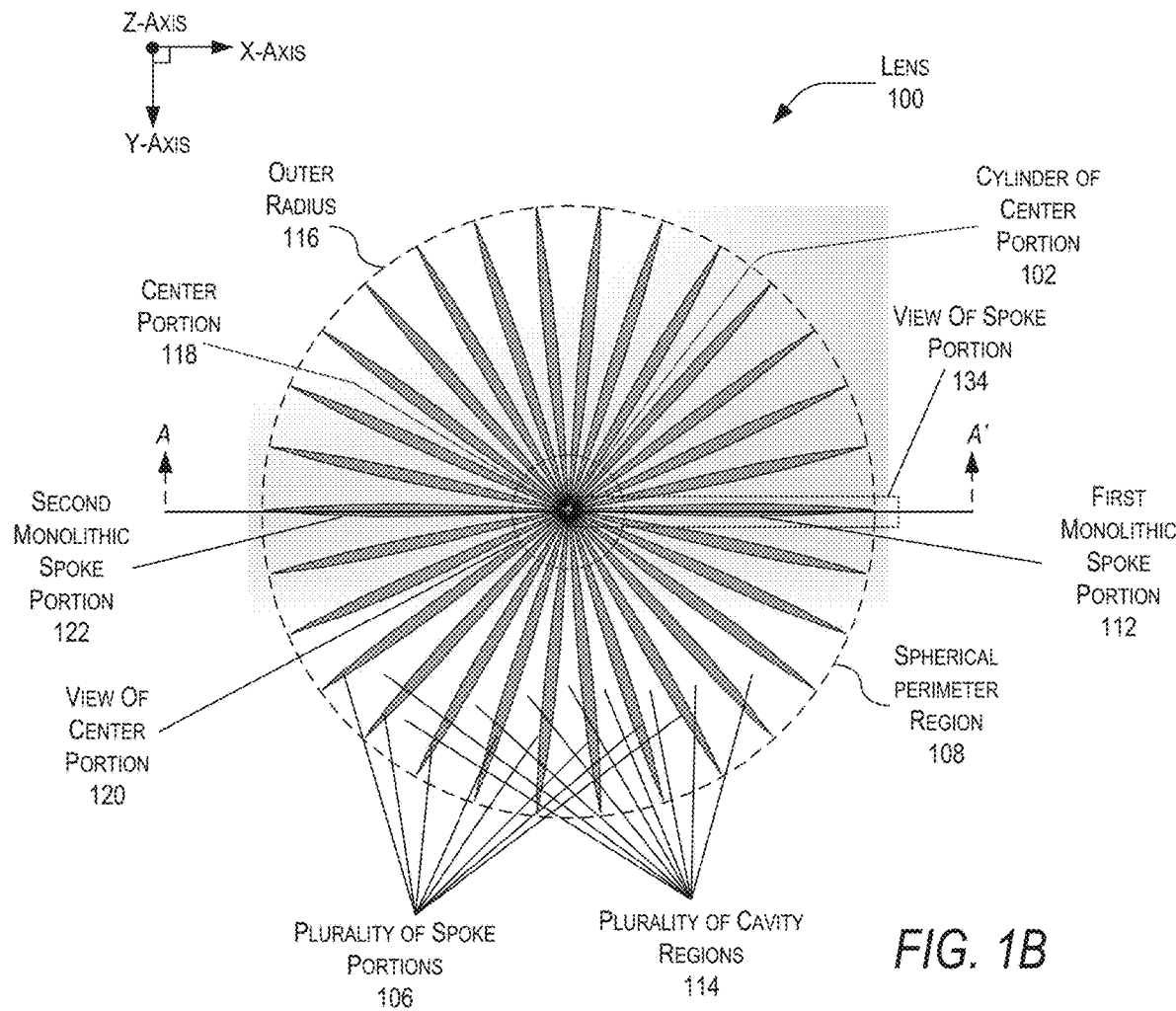
FIG. 1B is a top view of the spoke dielectric lens in accordance with the present disclosure.
Figure 1C:
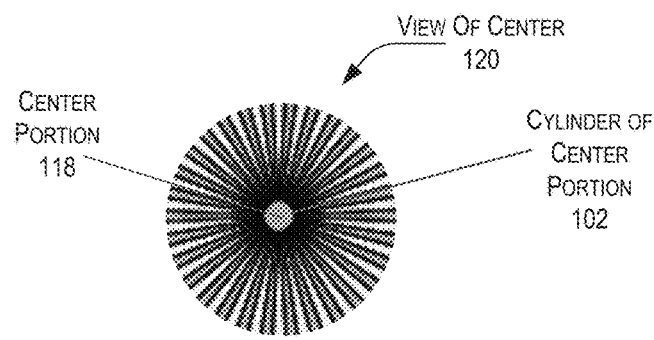
FIG. 1C is an expanded view of the center portion, shown in FIGS. 1A and 1B, showing the relationship between the center portion and cylinder.

In FIG. 1B, a top view of the spoke dielectric lens 100 is shown in accordance with the present disclosure. In this example, the cylinder 102 is shown at the center portion 118. In FIG. 1C, an expanded view 120 of the center portion 118 is shown showing the relationship between the center portion 118 and cylinder 102. In this example, the first monolithic spoke portion 112 is shown extending from the cylinder 102 to the outer radius 116 of the spherical perimeter region 108 along a radial direction in a positive direction of the X-axis. Additionally, a second monolithic spoke portion 122 is also shown extending from the cylinder 102 to the outer radius 116 of the spherical perimeter region 108 along a radial direction in the opposite (i.e., negative) direction of the X-axis. In this example, the number (N) of spoke portions in the plurality of spoke portions 106 may vary based on the design of the spoke dielectric lens 100. The number N is related to the minimum width of the spoke portions and a frequency associated with the operation of GRIN lens. In general, the number N relates to the minimum width of the spoke portions where having more spoke portions means that the spoke portions are narrower. Generally, a larger N is beneficial, but this may be limited by the manufacturing processes. Moreover, the greater the frequency associated with the operation of GRIN lens, the higher the value of N.

Figure 1D:
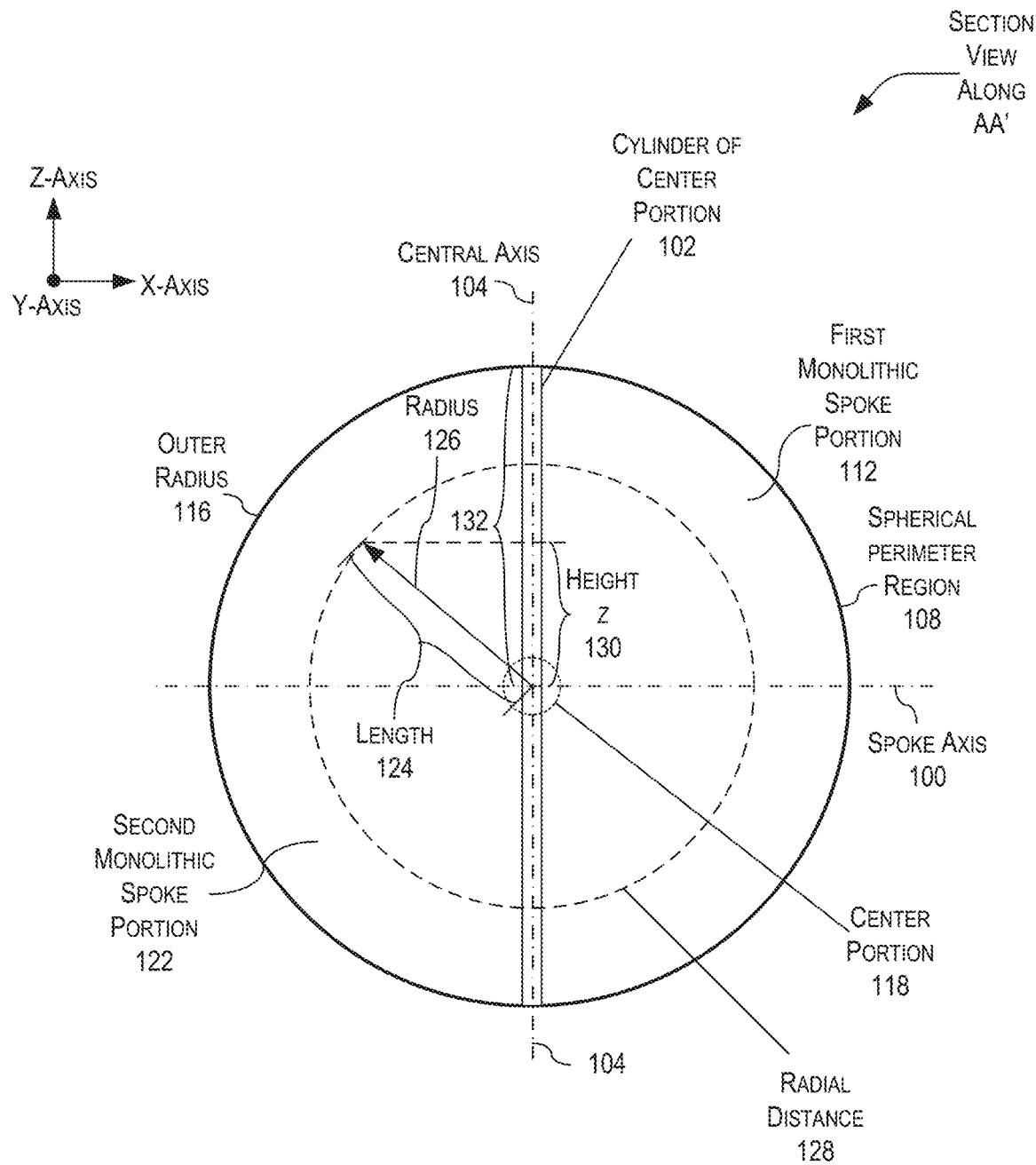
FIG. 1D is a section view along a cutting plane AA' in accordance with the present disclosure.

In this example, the spoke dielectric lens 100 is shown as having a cutting plane AA' that passes through first monolithic spoke portion 112, second monolithic spoke portion 122, and cylinder 102 and extends along the X and Z axes. In FIG. 1D, a section view along a cutting plane AA' is shown in accordance with the present disclosure. Again, the first monolithic spoke portion 112 is shown extending from the cylinder 102 to the outer radius 116 of the spherical perimeter region 108 along a radial direction in a positive direction of an X-Z plane of the X-axis and Z-axis and the second monolithic spoke portion 122 is shown extending from the cylinder 102 to the outer radius 116 of the spherical perimeter region 108 along a radial direction in the opposite direction along the X-Z plane. In this example, the first monolithic spoke portion 112 and second monolithic spoke portion 122 are generally dielectric semi-circular blades extending outward from the cylinder 102 in opposite directions. The dielectric properties, such as the dielectric constant (i.e., the relative permittivity), of both the first monolithic spoke portion 112 and second monolithic spoke portion 122 generally vary as function of a length 124 along a radius 126 from the center portion 118 to a radial distance 128 that extends outwards towards the outer radius 116. In this example, the radial distance 128 has a component length (i.e., height (z) 130) projected along a length 132 of the of the cylinder 102.

In FIG. 1E, an expanded view 134 of a spoke portion 136 is shown in accordance with the present disclosure. The expanded view 134 is a top view of the spoke portion which may be, for example, a top view of the first monolithic spoke portion 112. The spoke portion 136 may have a first width $W_1$ at a first distance 138 from the cylinder 102 of the center portion 118 and a second width $W_2$ at a second distance 140 from the cylinder 102, where the second distance 140 is greater than the first distance 138 and the first width $W_1$ is different than the second width $W_2$. The spoke portion 136 may also include other widths along different distances along the spoke portion 136 such as, for example, a third width $W_3$ at a third distance 142. In this example, all the distances (i.e., first distance 138, second distance 140, and third distance 142) are along the radius 126 from the cylinder 102 to the outer radius 116. In the example illustrated in FIG. 1E, the spoke portion 136 is shown as having the second width $W_2$ that is greater than the first width $W_1$ and the spoke portion 136 having a tapered profile that increases in width as a function of distance from the cylinder 102 to the outer radius 116. However, in another example, the spoke portion 136 may have the second width $W_2$ being less than the first width $W_1$ and the spoke portion may have a tapered profile that decreases in width as a function of distance from the cylinder 102 to the outer radius 116.

Alternatively, the spoke portion 136 may further include the third width $W_3$ at a third distance 142 from the cylinder 102, the third distance 142 greater than the second distance 140, where the second width $W_2$ is greater than the first width $W_1$ and the second width $W_2$ is also greater than the third width $W_2$. In this example, the spoke portion 136 may have a dual-tapered profile that increases in width as a function of distance from the cylinder 102 of the center portion 118 until a particular distance from the center portion 118 and then decreases in width as a function of distance from the center portion 118.

Moreover as another alternative, the spoke portion 136 may have the third width $W_3$ at a third distance 142 from the center portion 118, where the third distance 142 is greater than the second distance 140 and the second width $W_2$ is less than the first width $W_1$ and the second width $W_2$ is less than the third width $W_3$. In this example, the spoke portion 136 may have a reverse dual-tapered profile that decreases in width as a function of distance from the center portion 118 until a particular distance from the center portion 118 and then increases in width as a function of distance from the center portion 118.

As discussed earlier, the spoke portion 136 is constructed of a material or materials that have optional varying dielectric constant. It is appreciated by those of ordinary skill in the art that the dielectric constant is the ratio of the permittivity of a substance to the permittivity of free space and that it is an expression of the extent to which a material concentrates electric flux such that as the dielectric constant increases, the electric flux density increases.

Specifically, the spoke portion 136 is constructed of a material that includes width (w), the height (z) 130, and the length 124 along the radius (r) 126 extending from the center portion 118 to the outer radius 116. The width w is equal to a numerical expression defined as $$\frac{2\pi r(z^2 + r^2 - R_{max}^2)}{NR_{max}^2(\varepsilon_{rel} - 1)}.$$

In this expression, $R_{max}$ is equal to the outer radius 116 of the GRIN lens at the spherical perimeter region 108, N is equal to a number of spoke portions (such as spoke portion 136) in the plurality of spoke portions, and $\varepsilon_{rel}$ is a relative permittivity of the plurality of relative permittivities.

In this example and as discussed earlier, the height z 130 is equal to the component length of the radius r 126 from the center portion 118 projected along the central axis 104. The number of spoke portions N is related to a frequency of operation associated with the GRIN lens. Moreover, in this example, the plurality of relative permittivities include a continuous range of relative permittivities.

Figure 1F:
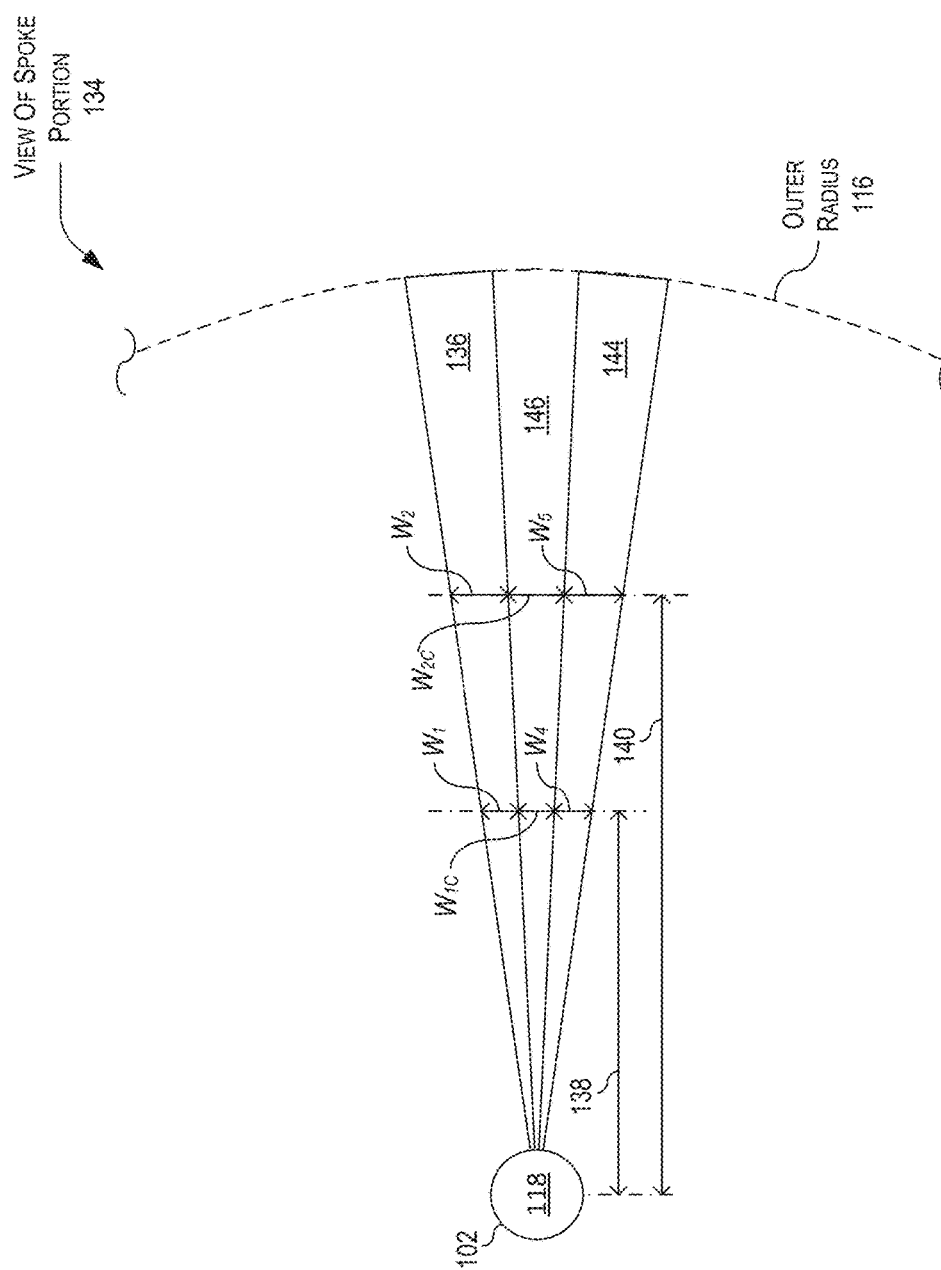
FIG. 1F is a top view showing another spoke portion adjacent to the spoke portion, shown in FIGS. 1D and 1E, in accordance with the present disclosure.

In FIG. 1F, another spoke portion 144 is shown adjacent to the first spoke portion 136 in accordance with the present disclosure. In this example, similar to the first spoke portion 136, the second spoke portion 144 may have a first width $W_4$ at the first distance 138 from the cylinder 102 of the center portion 118 and a second width $W_5$ at the second distance 140 from the cylinder 102, where the second distance 140 is greater than the first distance 138 and the first width $W_4$ is different than the second width $W_5$. The second spoke portion 144 may also include other widths along different distances along the second spoke portion 144 such as, for example, a third width (not shown) at the third distance 142.

In this example, the first spoke portion 136 and the second spoke portion 144 are approximately adjacent to each other and define, in combination with the cylinder 102 and the spherical perimeter region 108 at the outer radius 116 a cavity region 146 between the first spoke portion 136 and second spoke portion 144 that extends from the cylinder 102 to the spherical perimeter region 108. The cavity region 146 has a first width $W_{1C}$ at the first distance 138 from the center portion 118 and a second width $W_{2C}$ at the second distance 140 from the center portion 118, where the first width $W_{1C}$ is different than the second width $W_{2C}$.

Similar to the first spoke portion 136, the second spoke portion 144 and cavity region 146 may have tapered profiles. Specifically, the cavity region 146 may have a tapered profile that increases in width as a function of distance from the center portion 118, where the second width $W_{2C}$ is greater than the first width $W_{1C}$. Alternatively, the cavity region 146 may have a tapered profile that decreases in width as a function of distance from the center portion 118, where the second width $W_{2C}$ is less than the first width $W_{1C}$.

In these examples, the cavity region 146 may be empty (i.e., air or vacuum gap) or filled with a dielectric material that is different than the dielectric material of the first spoke portion 136 and second spoke portion 144, where dielectric material of the cavity region 146 has a different dielectric constant then the material utilized to construct the first spoke portion 136 and second spoke portion 144. It is appreciated by those of ordinary skill in the art that the dielectric constant is the ratio of the permittivity of a material/substance to the permittivity of free space and that it is an expression of the extent to which a material concentrates electric flux such that as the dielectric constant increases, the electric flux density increases.

In general, the cylinder 102 of the center portion 118 and plurality of spoke portions 106 define the plurality of cavity regions 114 among the plurality of spoke portions 106. Additionally, one or more of the plurality of cavity regions 114 may be filled with or may include a material, such as a second material (e.g., a plastic or another material) that is different than a first material included in the plurality of spoke portions 106. The second material may have a different dielectric constant than the first material. Moreover, the cylinder 102 may be constructed of a material that has a dielectric constant that is greater than dielectric constants associated with the plurality of spoke portions 106.

In general, the cylinder 102 and plurality of spoke portions 106 may be constructed of materials that include, for example, a thermoset plastic, a polycarbonate, a cross-linked polystyrene copolymer, and Polytetrafluoroethylene ("PTFE"). As such, example materials include REXO-LITE® and TEFLON®. REXOLITE® 1422 is manufactured by C-Lec Plastics, Inc. of Philadelphia, Pa. TEFLON® is available from The Chemours Company of Wilmington, Del. In this example, the spoke dielectric lens 100 may be formed by injection molding or some other process (e.g. 3-D printing or additive manufacturing). In this example, the spoke dielectric lens 100 may optionally include a radome (shown in FIG. 8 as radome 800) disposed adjacent to the spherical perimeter region 108 of the spoke dielectric lens 100.

As described earlier, the spoke dielectric lens 100 has a plurality of relative permittivities constants that are based on a radial distance 128 from the center portion 118 (e.g., where each radius 126 of the spoke dielectric lens 100 is associated with a particular relative permittivity). As used herein, a relative permittivity refers to an average relative permittivity associated with a portion of the spoke dielectric lens 100, where the average relative permittivity is affected by the relative permittivities of other portions of the spoke dielectric lens 100. For example, a relative permittivity may be determined using a weighted average that weights other relative permittivities based on proximity to a given portion of the spoke dielectric lens 100. In a particular example, a relative permittivity is affected by a relative permittivity of one or more materials used to fabricate the spoke dielectric lens 100 and by a relative permittivity of the plurality of cavity regions 114 of the spoke dielectric lens 100 (which may be approximately equal to one).

Specifically, the spoke portions of the plurality of spoke portions 106 have a tapered profile, where a width of a spoke portion varies based on radial distance 128 from the center portion 118 to form the tapered profile. As a result, in this example, the plurality of relative permittivities includes a continuous range of relative permittivities based on tapered profiles of the plurality of spoke portions 106. Moreover, a "smooth" tapering of the plurality of spoke portions 106 may result in "smooth" transitions of relative permittivities of the spoke dielectric lens 100 (e.g., instead of discontinuous or stepwise changes in relative permittivities).

In this example, a number of spoke portions N included in the spoke dielectric lens 100 is related to a frequency associated with the spoke dielectric lens 100. For example, the number of spoke portions N may be selected based on a particular frequency or frequency range of operation that is to be provided to the spoke dielectric lens 100. In general, the spoke dielectric lens 100 is configured to focus (e.g., collimate) an EM signal that is to be transmitted or received by the spoke dielectric lens 100. When integrated into GRIN lens, the GRIN lens is configured to focus EM radiation to transmit or to receive a far-field high-gain signal. In this example, the GRIN lens may be integrated into an antenna having a radome and configured to transmit or receive an EM signal through the GRIN lens.

In general, the spoke dielectric lens 100 is a Luneburg lens, however, the spoke dielectric lens 100 may also be configured as a Maxwell fisheye lens. In the case of a Luneburg lens, the spoke dielectric lens 100 is configured as a spherically symmetric GRIN lens with varying refractive index which decreases radially from the center portion 118 to the spherical perimeter region 108 according to the relationship $$n = \sqrt{\varepsilon_{rel}} = \sqrt{2 - \left(\frac{r}{R_{max}}\right)^2},$$

where n is the refractive index, r is the radius 126, $R_{max}$ is the outer radius 116 of the GRIN lens at the spherical perimeter region 108 and $\varepsilon_{rel}$ is a relative permittivity of the plurality of relative permittivities of the GRIN lens. In this example, the Luneburg lens focuses collimated EM radiation incident on the surface of spherical perimeter region 108 to a point on the opposite surface.

If the spoke dielectric lens 100 is configured as a Maxwell's fisheye lens, the spoke dielectric lens 100 will be a spherically symmetric GRIN lens with a varying reflective index that decreases radially from the center portion 118 to the spherical perimeter region 108 according to the relationship $$\varepsilon_{rel} = \frac{\varepsilon_0}{\left(1 + \left(\frac{r}{R_{max}}\right)^2\right)^2},$$

where $\varepsilon_0$ is the permittivity at the center portion 118, r is the radius 126, $R_{max}$ is the outer radius 116 of the GRIN lens at the spherical perimeter region 108 and $\varepsilon_{rel}$ is a relative permittivity of the plurality of relative permittivities of the GRIN lens. In this example, the Maxwell's Fisheye lens focuses each point on the surface of spherical perimeter region 108 to a point on the opposite side of the surface of spherical perimeter region 108. By cutting the spoke dielectric lens 100 (that is configured as a Maxwell Fisheye lens) in half into a hemisphere, the hemispherical fisheye lens would focus collimate EM radiation incident on the flat surface of hemisphere to a point on the opposite spherical surface of the spherical perimeter region 108.

In the case that the spoke dielectric lens 100 is configured as a Maxwell fisheye lens, the relationship for determining the width w of the spoke portion 136 is different than previously described. The relationship for the width w of the spoke portion 136 for a Maxwell fisheye lens is $$w = \frac{2\pi r(z^4 + 2z^2(r^2 + R_{max}^2) + r^4 + 2r^2 R_{max}^2 - (\varepsilon_{rel} - 1)R_{max}^2)}{N(\varepsilon_{rel} - 1)(z^2 + r^2 - R_{max}^2)^2}.$$

In this expression, z is the height 130, r is the length 124 along the radius extending from the center portion 118, $R_{max}$ is equal to the outer radius 116 of the GRIN lens at the spherical perimeter region 108, N is equal to a number of spoke portions (such as spoke portion 136) in the plurality of spoke portions, and $\varepsilon_{rel}$ is a relative permittivity of the plurality of relative permittivities.

In these examples, each spoke portion of the plurality of spoke portions 106 may be designed to have a spoke width w that varies with height z 130 so as to provide a continuous effective permittivity variation on a plane, with only stepwise permittivity variation along a vertical axis (i.e., the central axis 104). Alternatively, each spoke portion may be designed with a twist, similar to a fan blade, to increase uniformity of the spoke portion placement around the spherical (or hemispherical) spherical perimeter region 108.

The spoke dielectric lens 100 may be fabricated using an additive computerized manufacturing process, such as a three-dimensional (3D) printing process or a sintering process. Alternatively, or in addition, the spoke dielectric lens 100 may be fabricated using a subtractive computerized manufacturing process, such as a milling process. In a particular example, the spoke dielectric lens 100 is fabricated using a combination of one or more additive computerized manufacturing processes and one or more additive and one or more subtractive computerized manufacturing processes, such as a combined photolithographic and etching process, as an illustrative example. The spoke dielectric lens 100 may be manufactured using a single material or using multiple materials (e.g., using a primary material and one or more dopant materials).

Figure 2:
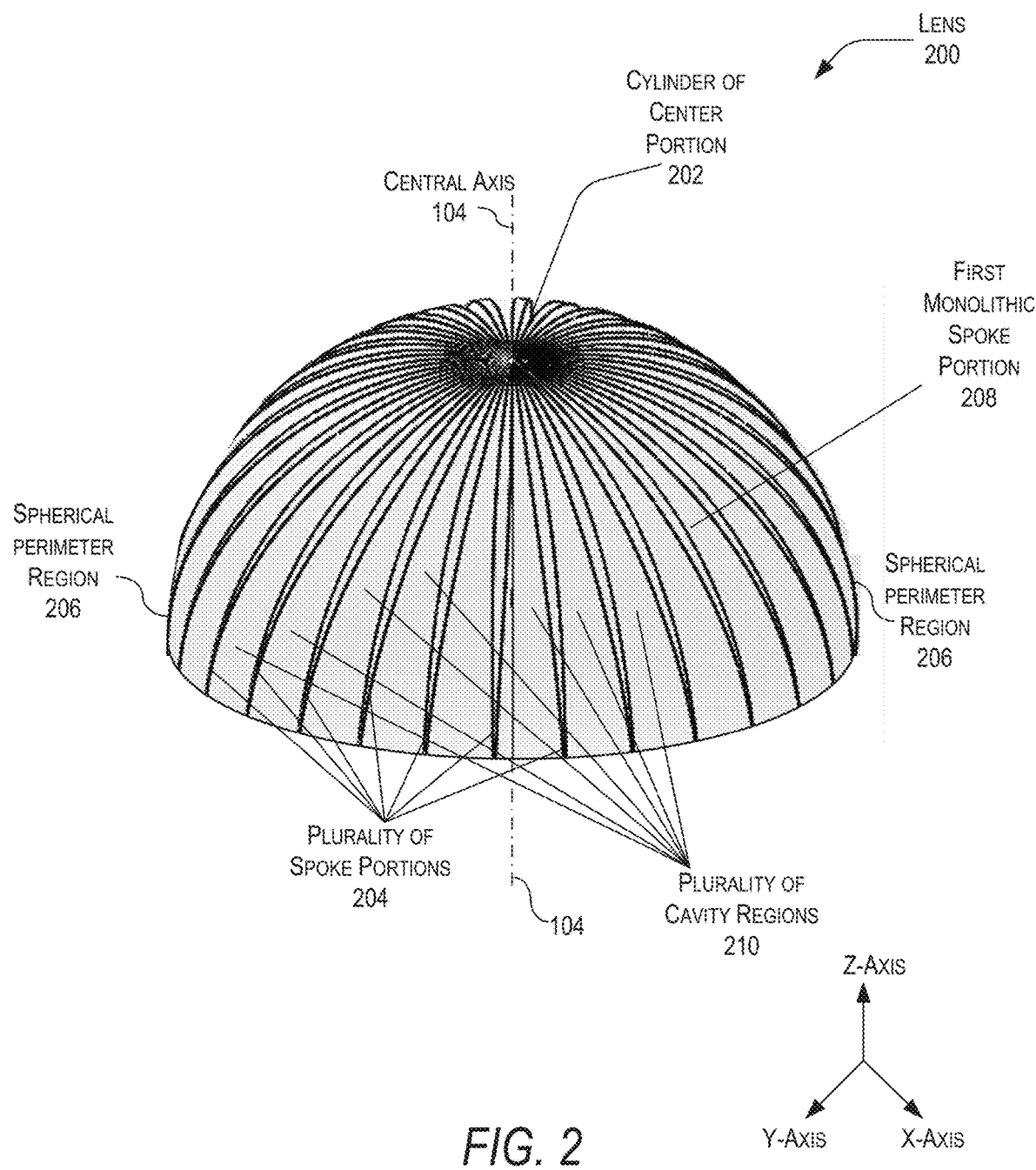
FIG. 2 is a perspective view of an example of another implementation of a spoke dielectric lens in accordance with the present disclosure.

Turning to FIG. 2, a perspective view of an example of another implementation of a spoke dielectric lens 200 is shown in accordance with the present disclosure. Similar to the spoke dielectric lens 100 shown in FIGS. 1A-1F, the spoke dielectric lens 200 includes a cylinder 202 of a center portion along the central axis 104 and a plurality of spoke portions 204 that are attached to the cylinder 202 of the center portion and extend to a spherical perimeter region 206 in a radial direction from the cylinder 202 of the center portion. In this example, the plurality of spoke portions 204 includes at least a first monolithic spoke portion 208 extending from the cylinder 102 of the center portion to the spherical perimeter region 206 and the cylinder 202 of the center portion and the plurality of spoke portions 204 define a plurality of cavity regions 210 among the plurality of spoke portions 204. The center portion, the cylinder 202, the plurality of spoke portions 204, and the plurality of cavity regions 210 are included in a GRIN lens having a plurality of relative permittivities that are based on a radial distance from the center portion. The difference in this example is that the spoke dielectric lens 200 is a hemisphere spoke dielectric lens 200 instead of a full spherical spoke dielectric lens 100 as shown and described in FIGS. 1A-1F.

Figure 3A:
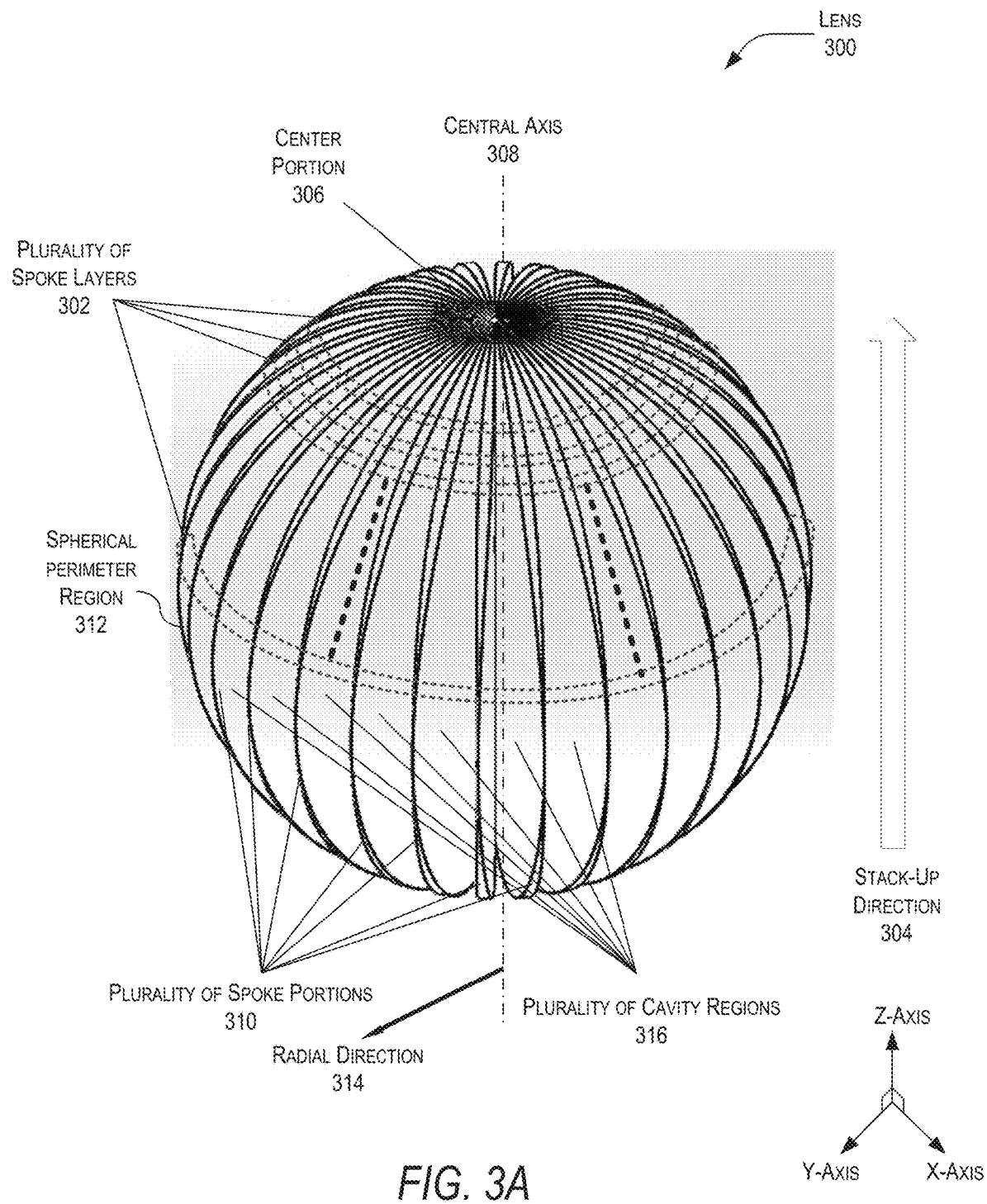
FIG. 3A is a perspective view of an example of another implementation of a spoke dielectric lens in accordance with the present disclosure.

In FIG. 3A, a perspective view of an example of another implementation of a spoke dielectric lens 300 is shown in accordance with the present disclosure. Instead of utilizing a plurality of spoke portions 106 that extend the full height z 130 of the cylinder along the central axis 104 as shown and described in FIGS. 1A-2, the spoke dielectric lens 300 is instead constructed by utilizing a plurality of spoke layers 302 that are stacked up in a stack-up direction 304 to form the spoke dielectric lens 300. The spoke dielectric lens 300 comprises a center portion 306 that extends along a cylinder having a central axis 308 and the plurality of spoke layers 302. In this example, each spoke layer of the plurality of spoke layers 302 is attached to another spoke layer of the plurality of spoke layers 302 in a stack-up fashion along the cylinder in the stack-up direction 304 along the central axis 308. Each spoke layer comprises a plurality of spoke portions 310 that are attached to the cylinder and extend to a spherical perimeter region 312 in a radial direction 314 from the cylinder. The plurality of spoke portions 310 includes at least a first monolithic spoke portion extending from the cylinder to the spherical perimeter region 312 and the cylinder and the plurality of spoke portions 310 define a plurality of cavity regions 316 among the plurality of spoke portions 310. In this example, the cylinder, the plurality of spoke portions 310, and the plurality of cavity regions 316 are included in a GRIN lens having a plurality of relative permittivities that are based on a radial distance from the center portion 306.

In this example, it is appreciated that while only four (4) spoke layers are shown of the plurality of spoke layers 302, the entire spoke dielectric lens 300 is constructed of a potentially large number of spoke layers. In this example, only four spoke layers are shown for purpose of ease of illustration and it is not meant to limit the number of spoke layers in the plurality of spoke layers 302.

Figure 3B:
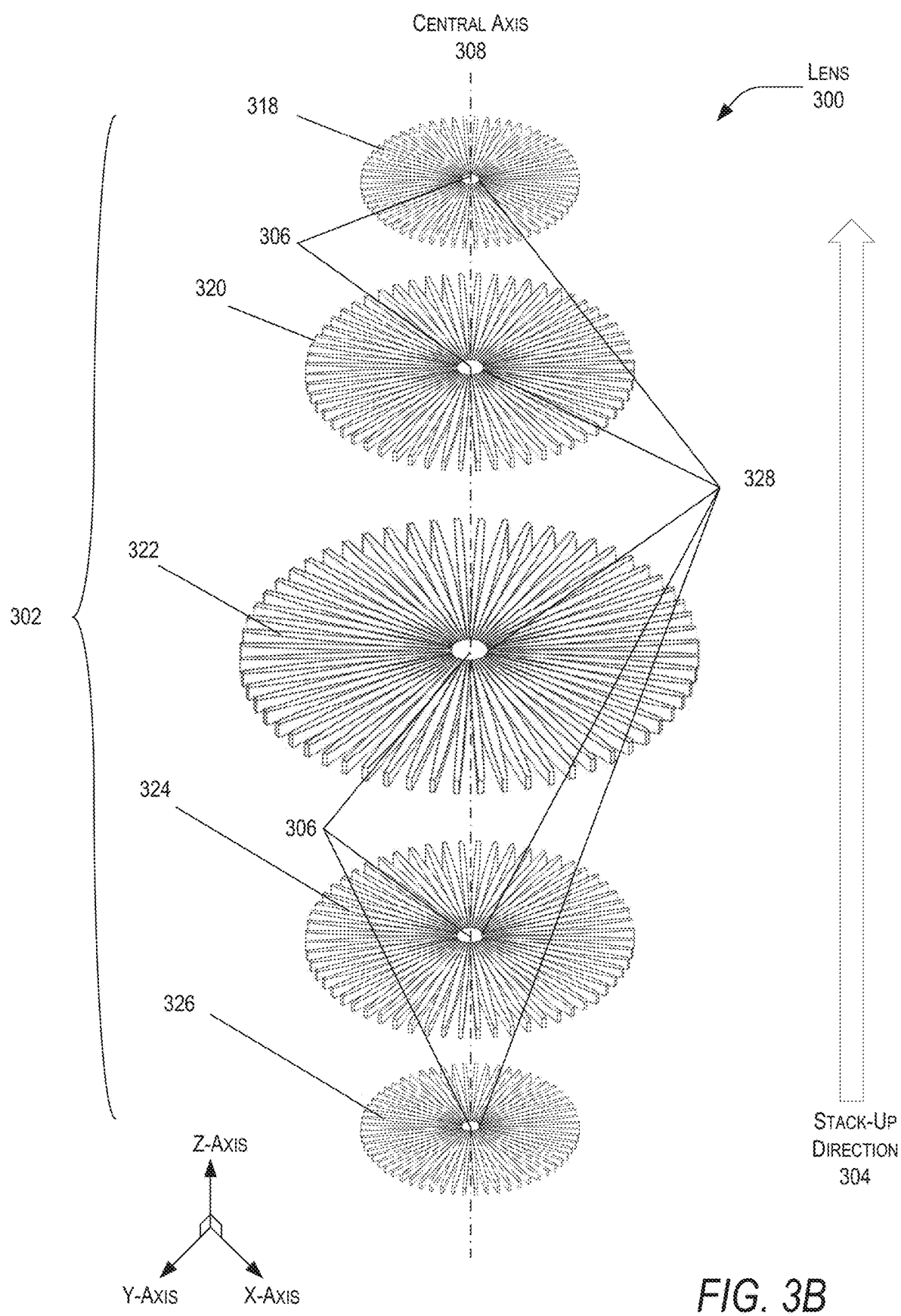
FIG. 3B is a perspective exploded view of the spoke dielectric lens shown in FIG. 3A in accordance with the present disclosure.

In FIG. 3B, a perspective exploded view of the spoke dielectric lens 300 is shown in accordance with the present disclosure. In this example the spoke dielectric lens 300 is shown to be constructed from a plurality of spoke layers 302 that include, for example a first spoke layer 318, second spoke layer 320, third spoke layer 322, fourth spoke layer 324, and fifth spoke layer 326. Again, in this example, it is appreciated that while only five (5) spoke layers are shown of the plurality of spoke layers 302, the entire spoke dielectric lens 300 is constructed of a potentially large number of spoke layers and the five spoke layers are shown for purpose of ease of illustration. In this example, the third spoke layer 322 is the middle and largest spoke layer of the plurality of spoke layers 302. The third spoke layer 322 has the largest radius extending from the cylinder 328 of the center portion 306 to the outer radius of the spherical perimeter region 312. Second spoke layer 320 has a smaller radius than the third spoke layer 322 and the first spoke layer 318 has a smaller radius than the second spoke layer 320. Similarly, the fourth spoke layer 324 has a smaller radius than the third spoke layer 322 and the fifth spoke layer 326 has a smaller radius than the fourth spoke layer 324.

In general, the spoke dielectric lens 300 may be fabricated using an additive computerized manufacturing process, such as a 3D printing process or a sintering process. Alternatively, or in addition, the spoke dielectric lens 300 may be fabricated using a subtractive computerized manufacturing process, such as a milling process. In a particular example, the spoke dielectric lens 300 is fabricated using a combination of one or more additive computerized manufacturing processes and one or more additive and one or more subtractive computerized manufacturing processes, such as a combined photolithographic and etching process, as an illustrative example. The spoke dielectric lens 300 may be manufactured using a single material or using multiple materials (e.g., using a primary material and one or more dopant materials).

Figure 3C:
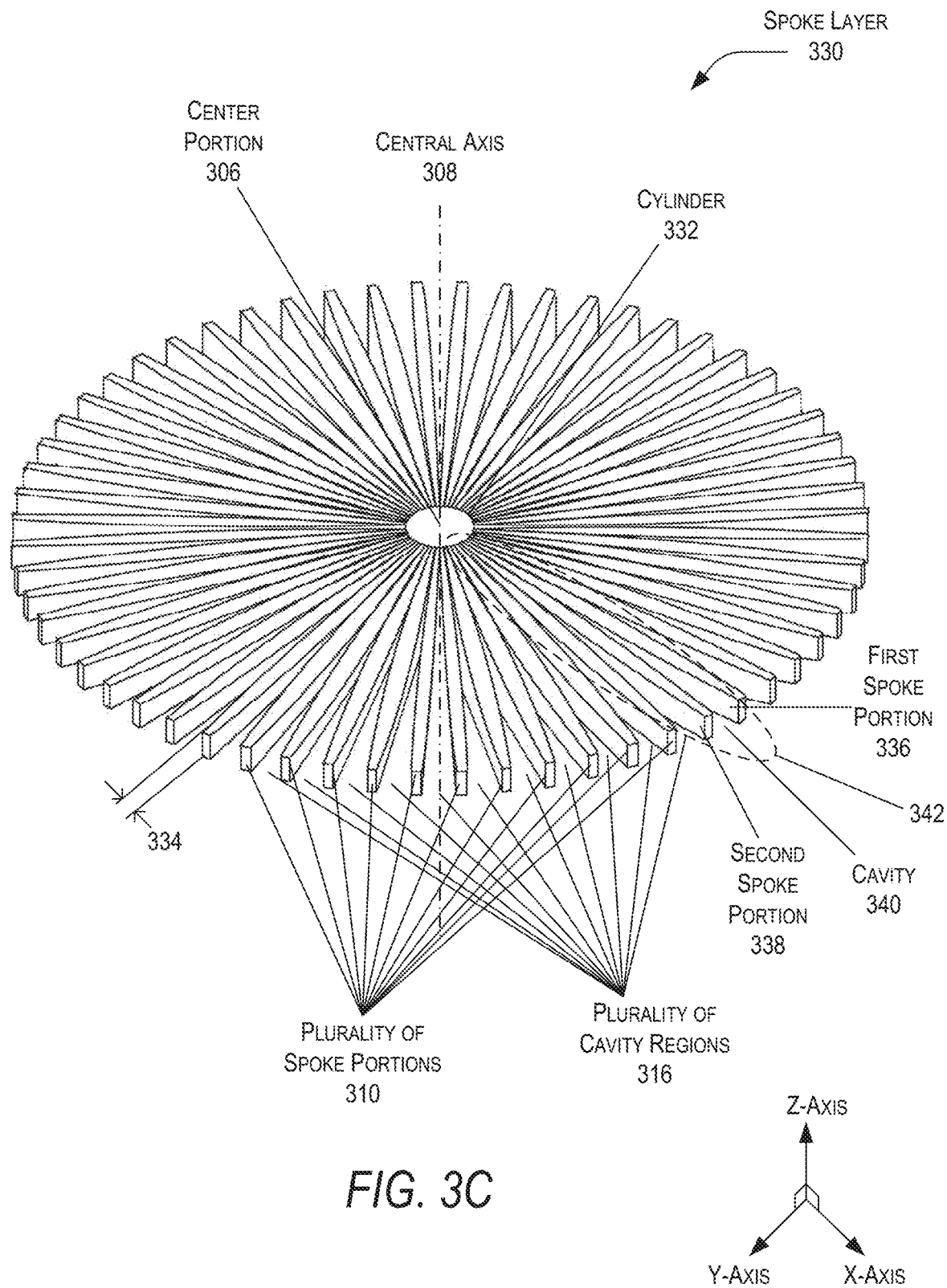
FIG. 3C is a perspective view of an example of an implementation of a spoke layer of the spoke dielectric lens shown in FIGS. 3A and 3B in accordance with the present disclosure.

In FIG. 3C, a perspective view of an example of an implementation of a spoke layer 330 of the spoke dielectric lens 300 is shown in accordance with the present disclosure. In this example, the cylinder 332 is shown in relation to the center portion 306, plurality of spoke portions 310, and plurality of cavity regions 316. The spoke layer 330 has a height z 334 and when attached to the other spoke layers of the plurality of spoke layers 302, the cylinder 332 and the cylinders of the other spoke layers forms a combined cylinder that runs an entire diameter of spoke dielectric lens 300 along the central axis 308 in the Z-axis. In this example, the spoke layer 330 is shown to include a first spoke portion 336 and second spoke portion 338 of the plurality of spoke portions 310 and a cavity region 340 of the plurality of cavity regions 316.

Figure 3D:
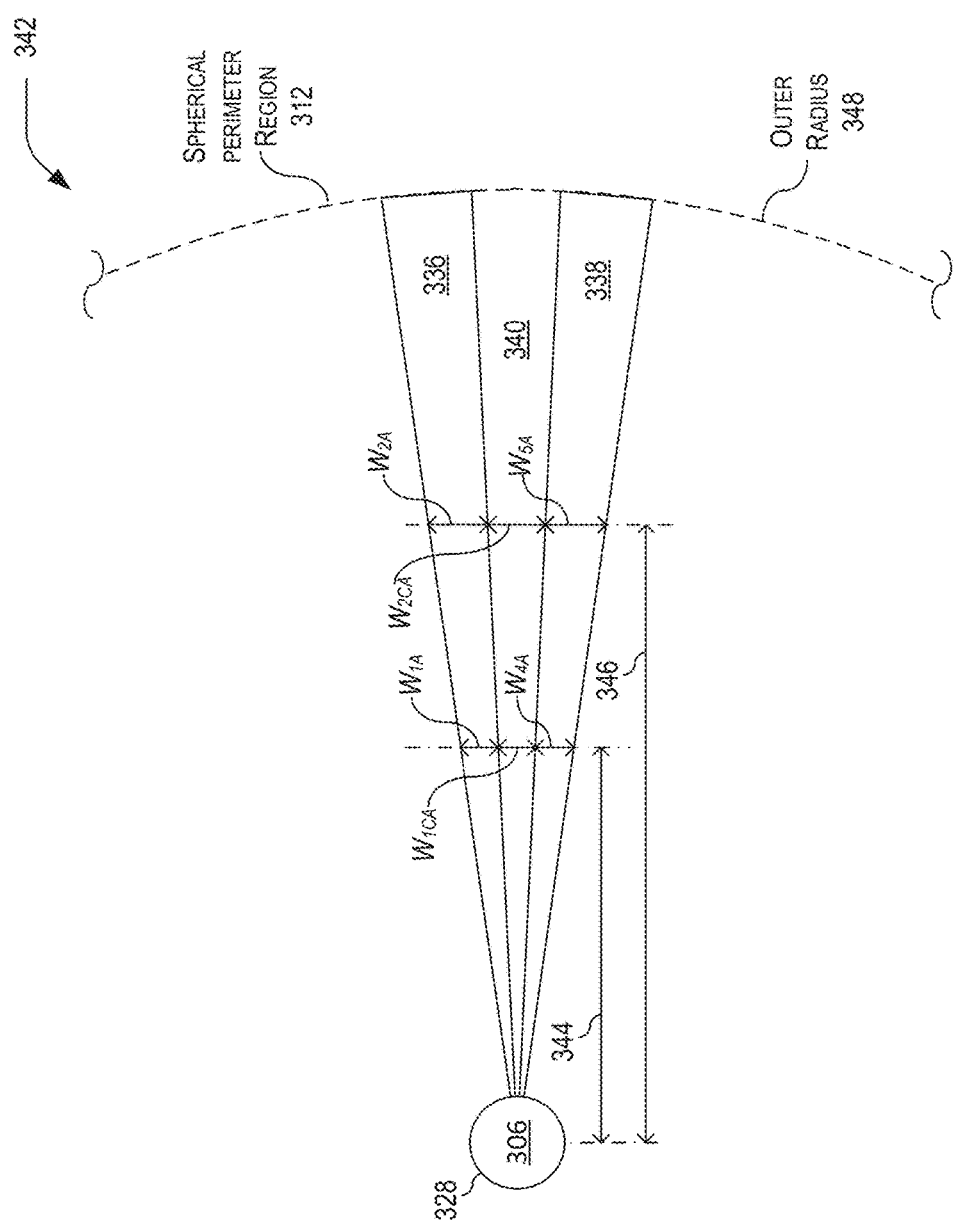
FIG. 3D is a top view of two adjacent spoke portions of the spoke layer shown in FIG. 3C in accordance with the present disclosure.

In FIG. 3D, an expanded view 342 of two adjacent spoke portions (i.e., the first spoke portion 336 and second spoke portion 338) of the spoke layer 330 is shown in accordance with the present disclosure. The expanded view 134 is a top view of the spoke layer 330. The first spoke portion 336 and second spoke portion 338 are a first and second monolithic spoke portions.

In this example, the first spoke portion 336 may have a first width $W_{1A}$ at a first distance 344 from the cylinder 328 of the center portion 306 and a second width $W_{2A}$ at a second distance 346 from the cylinder 328, where the second distance 346 is greater than the first distance 344 and the first width $W_{1A}$ is different than the second width $W_{2A}$. The first spoke portion 336 may also include other widths along different distances along the first spoke portion 336 such as, for example, a third width at a third distance. In this example, all the distances (i.e., first distance 344, second distance 346, and third distance) are along a radius from the cylinder 328 to the outer radius 348 at the spherical perimeter region 312. In this example, the first spoke portion 336 is shown as having the second width $W_{2A}$ that is greater than the first width $W_{1A}$ and the first spoke portion 336 having a tapered profile that increases in width as a function of distance from the cylinder 328 to the outer radius 348. However, in another example, the first spoke portion 336 may have the second width $W_{2A}$ being less than the first width $W_{1A}$ and the first spoke portion 336 may have a tapered profile that decreases in width as a function of distance from the cylinder 328 to the outer radius 348. Similarly, the second spoke portion 338 is shown as having the second width $W_{5A}$ that is greater than the first width $W_{4A}$ and the second spoke portion 338 having a tapered profile that increases in width as a function of distance from the cylinder 328 to the outer radius 348. However, in another example, the second spoke portion 338 may have the second width $W_{5A}$ being less than the first width $W_{4A}$ and the second spoke portion 338 may have a tapered profile that decreases in width as a function of distance from the cylinder 328 to the outer radius 348.

Moreover, in this example, the second spoke portion 338 may have a first width $W_{4A}$ at the first distance 344 from the cylinder 328 of the center portion 306 and a second width $W_{5A}$ at the second distance 346 from the cylinder 328, where the second distance 346 is greater than the first distance 344 and the first width $W_{4A}$ is different than the second width $W_{5A}$. The second spoke portion 338 may also include other widths along different distances along the second spoke portion 338 such as, for example, a third width (not shown) at the third distance.

Furthermore, in this example, the first spoke portion 336 and the second spoke portion 338 are approximately adjacent to each other and define, in combination with the cylinder 328 and the spherical perimeter region 312 at the outer radius 348 the cavity region 340 between the first spoke portion 336 and second spoke portion 338 that extends from the cylinder 328 to the spherical perimeter region 312. The cavity region 340 has a first width $W_{1CA}$ at the first distance 344 from the center portion 306 and a second width $W_{2CA}$ at the second distance 346 from the center portion 306, where the first width $W_{1CA}$ is different than the second width $W_{2CA}$.

Similar to the first spoke portion 336, the second spoke portion 338 and the cavity region 340 may have tapered profiles. Specifically, the cavity region 340 may have a tapered profile that increases in width as a function of distance from the center portion 306, where the second width $W_{2CA}$ is greater than the first width $W_{1CA}$. Alternatively, the cavity region 340 may have a tapered profile that decreases in width as a function of distance from the center portion 306, where the second width $W_{2CA}$ is less than the first width $W_{1CA}$.

As discussed previously, a spoke portion of the plurality of spoke portions 310 (e.g., first spoke portion 336 or second spoke portion 338) is constructed of a material that includes width (w), a height z 334 of the spoke layer 330, and the length along the radius (r) extending from the center portion 306 to the outer radius 348. The width w is equal to a numerical expression defined as $$\frac{2\pi r(z^2 + r^2 - R_{max}^2)}{NR_{max}^2(\varepsilon_{rel} - 1)}.$$

In this expression, $R_{max}$ is equal to the outer radius 348 of the spoke layer 330 at the spherical perimeter region 108, N is equal to a number of spoke portions (such as spoke portion 336 or 338) in the plurality of spoke portions 310, and $\varepsilon_{rel}$ a relative permittivity of the plurality of relative permittivities.

Again, in the case that the spoke dielectric lens 300 is configured as a Maxwell fisheye lens, the relationship for determining the width w of the spoke portion is different than previously described. The relationship for the width w of the spoke portion for a Maxwell fisheye lens is $$w = \frac{2\pi r(z^4 + 2z^2(r^2 + R_{max}^2) + r^4 + 2r^2 R_{max}^2 - (\varepsilon_{rel} - 1)R_{max}^2)}{N(\varepsilon_{rel} - 1)(z^2 + r^2 - R_{max}^2)^2}.$$

In this expression, z is the height 334, r is the length along the radius extending from the center portion 306, $R_{max}$ is equal to the outer radius 348 of the spoke layer 330 at the spherical perimeter region 312, N is equal to a number of spoke portions in the plurality of spoke portions 310, and $\varepsilon_{rel}$ a relative permittivity of the plurality of relative permittivities.

Figure 4:
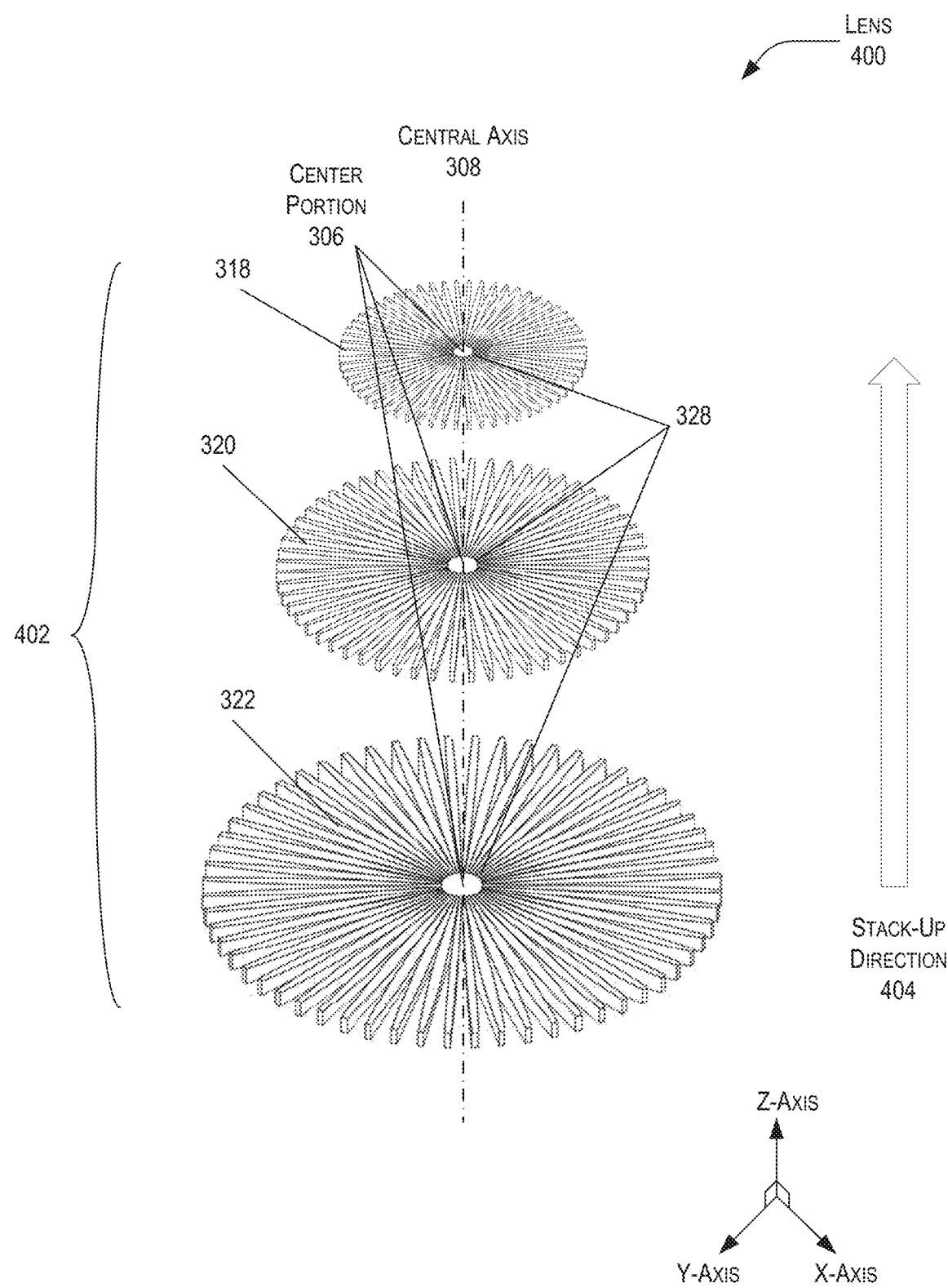
FIG. 4 is a perspective exploded view of an example of an implementation of another spoke dielectric lens in accordance with the present disclosure.

Turning to FIG. 4, a perspective exploded view of an example of an implementation of another spoke dielectric lens 400 is shown in accordance with the present disclosure. Similar to the spoke dielectric lens 300 shown in FIGS. 3A-3D, the spoke dielectric lens 400 includes a combined cylinder 328 of a center portion 306 along the central axis 308 and a plurality of spoke layers 402 that are attached to the cylinder 328 and extend to the spherical perimeter region 312 in the radial direction 314 from the cylinder 328. The difference in this example is that the spoke dielectric lens 400 is a hemisphere spoke dielectric lens 400 instead of a full spherical spoke dielectric lens 300 as shown and described in FIGS. 3A-3D.

In this example the spoke dielectric lens 400 is shown to be constructed from a plurality of spoke layers 402 that include, for example the first spoke layer 318, second spoke layer 320, and the third spoke layer 322. In this example, the third spoke layer 322 is the middle and largest spoke layer of the plurality of spoke layers 302. The third spoke layer 322 has the largest radius extending from the cylinder 328 of the center portion 306 to the outer radius of the spherical perimeter region 312. Second spoke layer 320 has a smaller radius than the third spoke layer 322 and the first spoke layer 318 has a smaller radius than the second spoke layer 320. The first, second, and third spoke layers 318, 320, and 322 are stacked-up along the stack-up direction 404.

In general, the spoke dielectric lens 400 may be fabricated using an additive computerized manufacturing process, such as a 3D printing process or a sintering process. Alternatively, or in addition, the spoke dielectric lens 400 may be fabricated using a subtractive computerized manufacturing process, such as a milling process. In a particular example, the spoke dielectric lens 400 is fabricated using a combination of one or more additive computerized manufacturing processes and one or more additive and one or more subtractive computerized manufacturing processes, such as a combined photolithographic and etching process, as an illustrative example. The spoke dielectric lens 400 may be manufactured using a single material or using multiple materials (e.g., using a primary material and one or more dopant materials).

Figure 5:
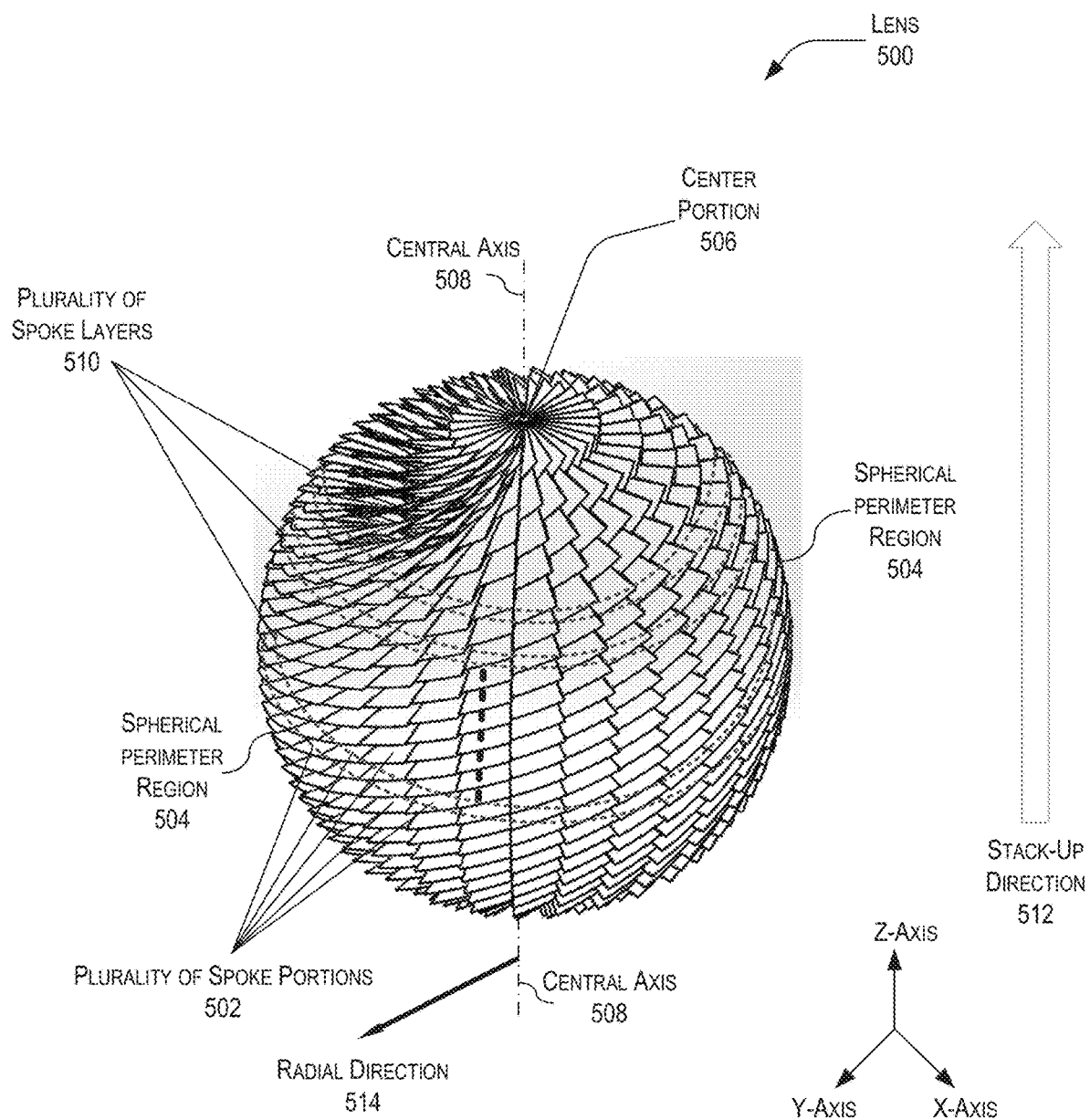
FIG. 5 is a perspective view of an example of an implementation of yet another spoke dielectric lens in accordance with the present disclosure.

In FIG. 5, a perspective view of an example of an implementation of yet another spoke dielectric lens 500 is shown in accordance with the present disclosure. In this example, each spoke portion of the plurality of spoke portions 502 is designed with a twist, similar to a fan blade, to increase uniformity of the spoke portion placement around the spherical perimeter region 504. Similar to the previous examples, the spoke dielectric lens 500 is oriented about a center portion 506 around a central axis 508.

In this example, the spoke dielectric lens 500 is constructed by utilizing a plurality of spoke layers 510 that are stacked up in a stack-up direction 512 to form the spoke dielectric lens 500. The spoke dielectric lens 500 comprises the center portion 506 that extends along a cylinder along the central axis 508 and the plurality of spoke layers 510.

In this example, each spoke layer of the plurality of spoke layers 510 is attached to another spoke layer of the plurality of spoke layers 510 in a stack-up fashion along the cylinder in the stack-up direction 512 along the central axis 508 along the Z-axis. Each spoke layer comprises spoke portions of the plurality of spoke portions 502 that are attached to the cylinder and extend to the spherical perimeter region 504 in a radial direction 514 from the cylinder. The plurality of spoke portions 502 includes at least a first monolithic spoke portion extending from the cylinder to the spherical perimeter region 504 and the cylinder and the plurality of spoke portions 502 define a plurality of cavity regions among the plurality of spoke portions 502. In this example, the cylinder, the plurality of spoke portions 502, and the plurality of cavity regions are included in a GRIN lens having a plurality of relative permittivities that are based on a radial distance from the center portion 506.

In this example, it is again appreciated that while only four (4) spoke layers are shown of the plurality of spoke layers 510, the entire spoke dielectric lens 500 is constructed of a potentially large number of spoke layers. In this example, only four spoke layers are shown for purpose of ease of illustration and it is not meant to limit the number of spoke layers in the plurality of spoke layers 510.

Figure 6A:
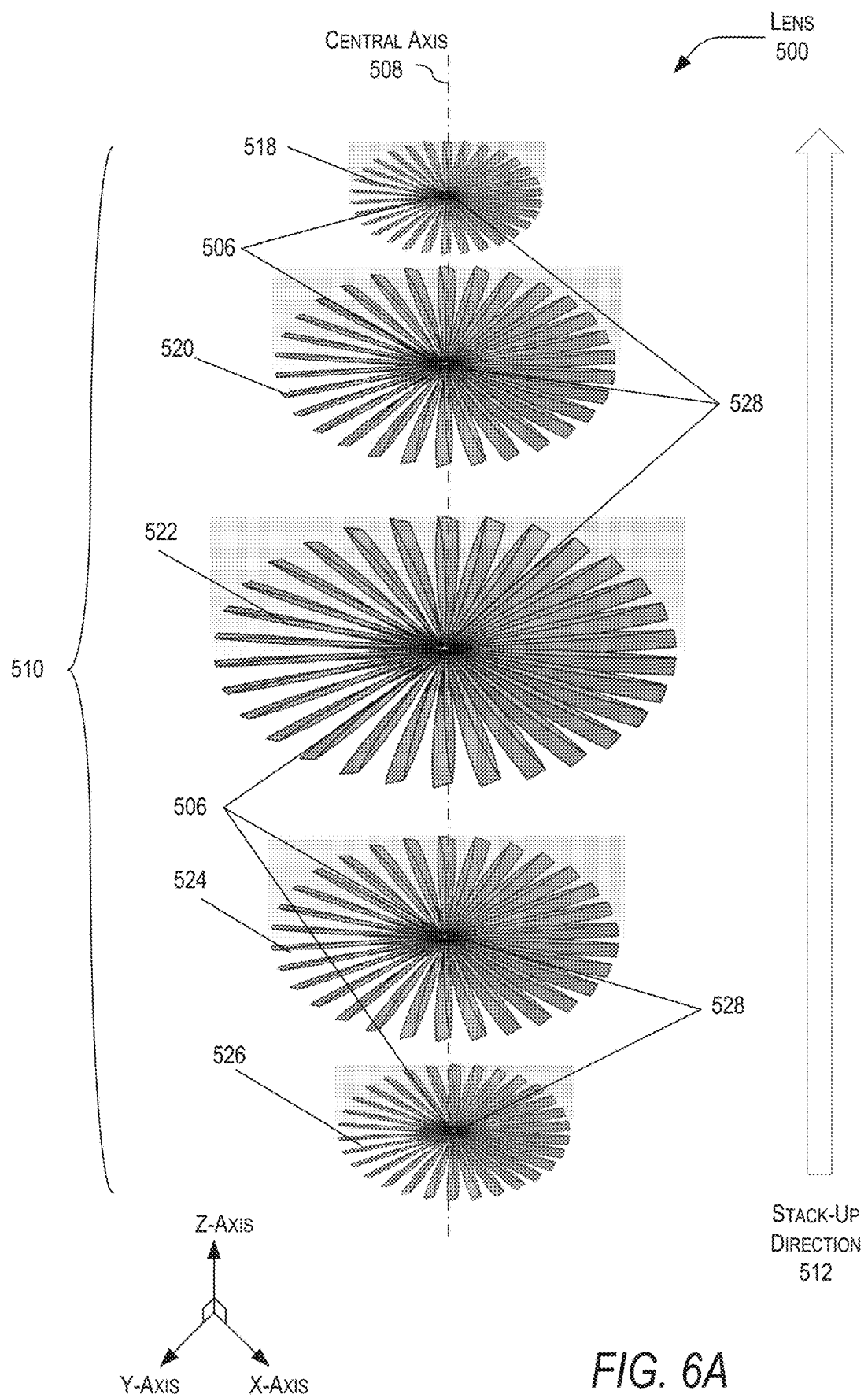
FIG. 6A is a perspective exploded view of the spoke dielectric lens shown in FIG. 6 in accordance with the present disclosure.

In FIG. 6A, a perspective exploded view of the spoke dielectric lens 500 is shown in accordance with the present disclosure. In this example the spoke dielectric lens 500 is shown to be constructed from a plurality of spoke layers 510 that include, for example a first spoke layer 518, second spoke layer 520, third spoke layer 522, fourth spoke layer 524, and fifth spoke layer 526. Again, in this example, it is appreciated that while only five (5) spoke layers are shown of the plurality of spoke layers 510, the entire spoke dielectric lens 500 is constructed of a potentially large number of spoke layers and the five spoke layers are shown for purpose of ease of illustration. In this example, the third spoke layer 522 is the middle and largest spoke layer of the plurality of spoke layers 510. The third spoke layer 522 has the largest radius extending from the cylinder 528 of the center portion 506 to the outer radius of the spherical perimeter region 504. The second spoke layer 520 has a smaller radius than the third spoke layer 522 and the first spoke layer 518 has a smaller radius than the second spoke layer 520. Similarly, the fourth spoke layer 524 has a smaller radius than the third spoke layer 522 and the fifth spoke layer 526 has a smaller radius than the fourth spoke layer 524.

In general, the spoke dielectric lens 500 may be fabricated using an additive computerized manufacturing process, such as a 3D printing process or a sintering process. Alternatively, or in addition, the spoke dielectric lens 500 may be fabricated using a subtractive computerized manufacturing process, such as a milling process. In a particular example, the spoke dielectric lens 500 is fabricated using a combination of one or more additive computerized manufacturing processes and one or more additive and one or more subtractive computerized manufacturing processes, such as a combined photolithographic and etching process, as an illustrative example. The spoke dielectric lens 500 may be manufactured using a single material or using multiple materials (e.g., using a primary material and one or more dopant materials).

Figure 6B:
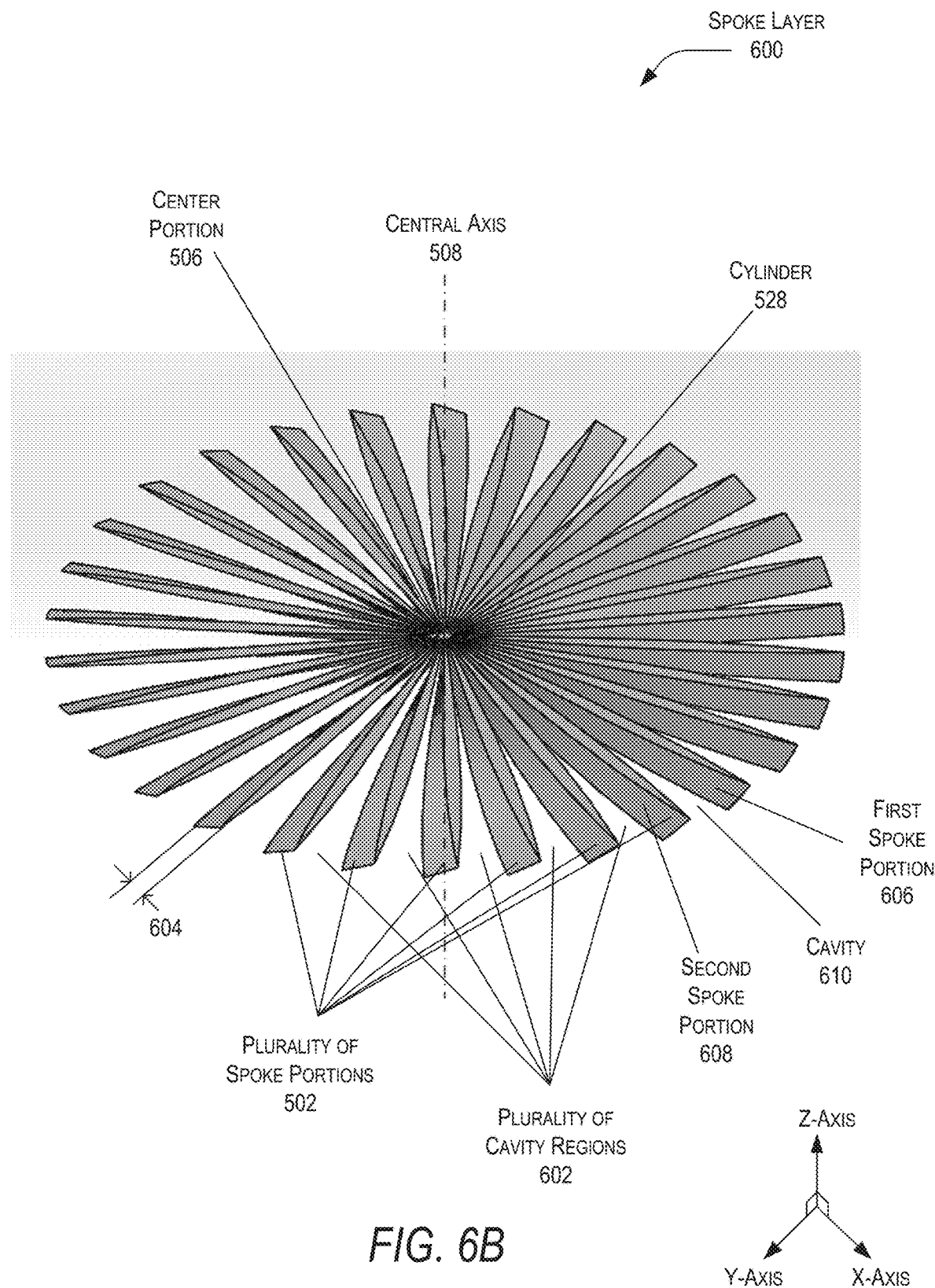
FIG. 6B is a perspective view of an example of an implementation of a spoke layer of the spoke dielectric lens shown in FIG. 6A in accordance with the present disclosure.

In FIG. 6B, a perspective view of an example of an implementation of a spoke layer 600 of the spoke dielectric lens 500 is shown in accordance with the present disclosure. In this example, the cylinder 528 is shown in relation to the center portion 506, plurality of spoke portions 502, and plurality of cavity regions 602. The spoke layer 600 has a height z 604 and when attached to the other spoke layers of the plurality of spoke layers 510, the cylinder 528 and the cylinders of the other spoke layers forms a combined cylinder that runs an entire diameter of the spoke dielectric lens 500 along the central axis 508 in the Z-axis. In this example, the spoke layer 600 is shown to include a first spoke portion 606 and second spoke portion 608 of the plurality of spoke portions 502 and a cavity region 610 of the plurality of cavity regions 602.

In this example, each of the spoke portions of the plurality of spoke portions 502 are shown as having a twist, similar to a fan blade, to increase the uniformity of the spoke portion placement around the spherical perimeter region 504.

Figure 7A:
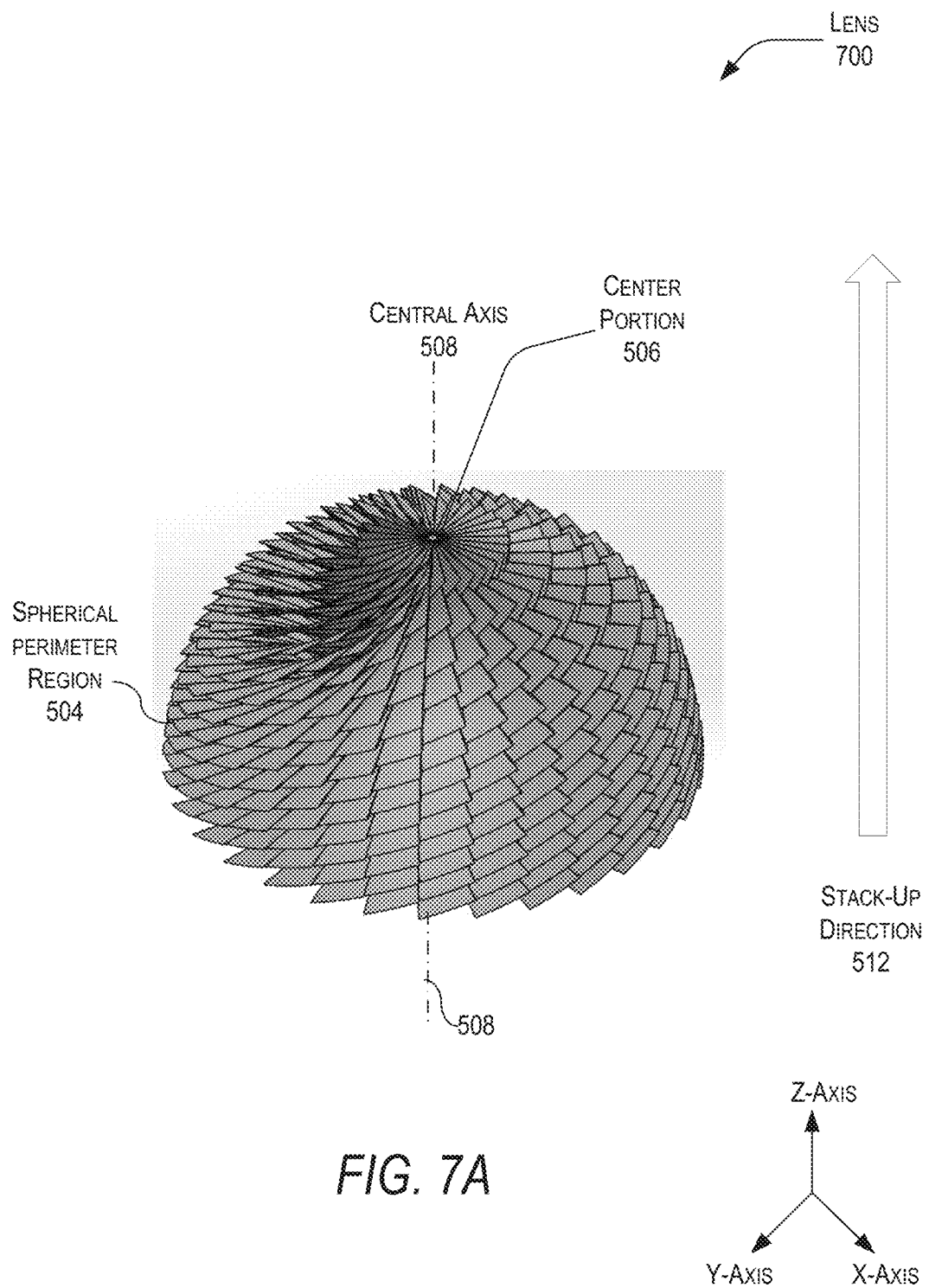
FIG. 7A is a perspective view of an example of an implementation of another spoke dielectric lens in accordance with the present disclosure.
Figure 7B:
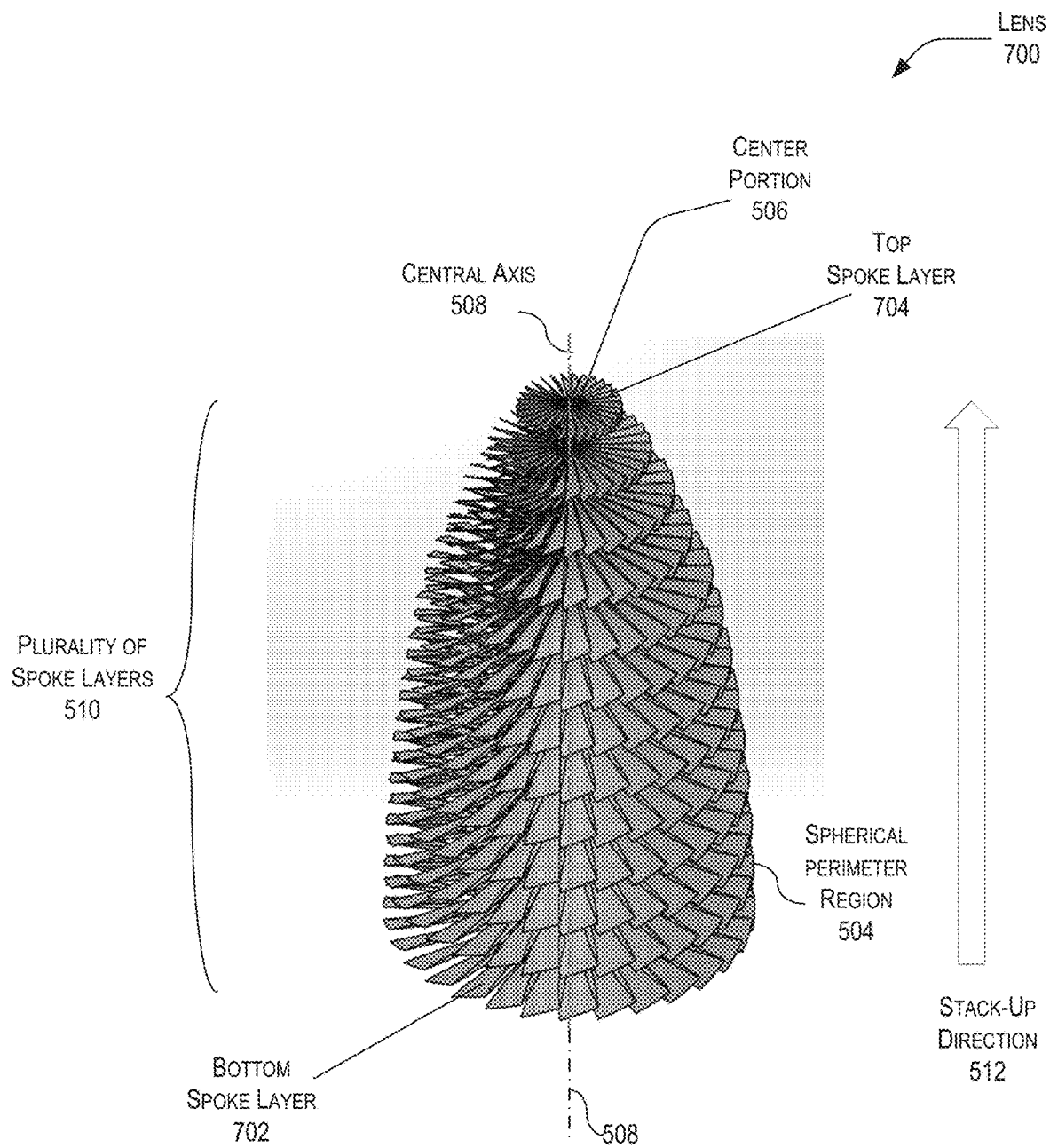
FIG. 7B is a perspective exploded view of the spoke dielectric lens shown in FIG. 7A in accordance with the present disclosure.

Turning to FIG. 7A, a perspective view of an example of an implementation of another spoke dielectric lens 700 is shown in accordance with the present disclosure. The spoke dielectric lens 700 is a hemisphere spoke dielectric lens 700 instead of a full spherical spoke dielectric lens 600 as shown and described in FIGS. 5-6B. In FIG. 7B, a perspective exploded view of the spoke dielectric lens 700 is shown in accordance with the present disclosure. In this example, the plurality of spoke layers 510 are stacked up in the stack-up direction 512 along the central axis 508 that is along the Z-axis from a bottom spoke layer 702 to a top spoke layer 704, where the bottom spoke layer 702 has the largest radius to the spherical perimeter region 504 and the top spoke layer 704 has the smallest radius to the spherical perimeter region 504.

Figure 8:
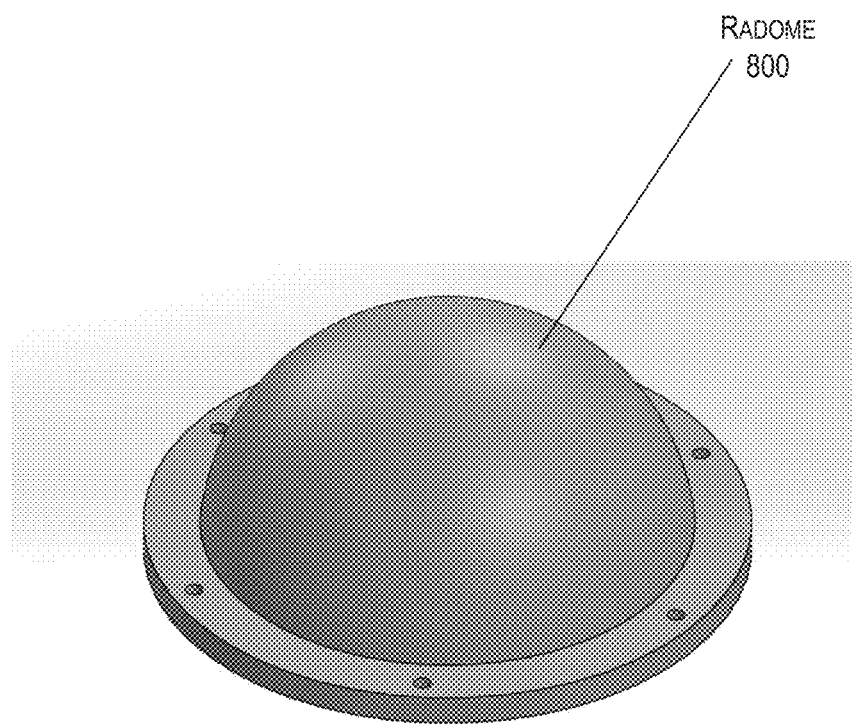
FIG. 8 is a perspective view of a radome for use with the spoke dielectric lens shown in FIGS. 1A-7B.

Turning to FIG. 8, a perspective view of a radome 800 is shown for use with the spoke dielectric lens shown in FIGS. 1A-8B.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure. Moreover, although the techniques have been described in language specific to structural features and/or methodological acts, it is to be understood that the appended claims are not necessarily limited to the features or acts described. Rather, the features and acts are described as example implementations of such techniques.

Further, the disclosure comprises embodiments according to the following clauses.

Clause 1. A dielectric lens comprising: a center portion that extends along a cylinder having a central axis; and a plurality of spoke portions that are attached to the center portion and extend to a spherical perimeter region in a radial direction from the center portion, wherein the plurality of spoke portions includes at least a first monolithic spoke portion extending from the center portion to the spherical perimeter region, wherein the center portion and the plurality of spoke portions define a plurality of cavity regions among the plurality of spoke portions, and wherein the center portion, the cylinder, the plurality of spoke portions, and the plurality of cavity regions are included in a gradient index (GRIN) lens having a plurality of relative permittivities that are based on a radial distance from the center portion.

Clause 2. The dielectric lens of clause 1, wherein the dielectric lens is a Luneburg lens, each spoke portion of the plurality of spoke portions is constructed of a material that includes a width, a height (z), and a length along a radius (r) extending from the center portion, the width is equal to a numerical expression defined as $$\frac{2\pi r(z^2 + r^2 - R_{max}^2)}{NR_{max}^2(\varepsilon_{rel} - 1)},$$

and
wherein $R_{max}$ is equal to an outer radius of the GRIN lens at the spherical perimeter region, N is equal to a number of spoke portions in the plurality of spoke portions, and $\varepsilon_{rel}$ is a relative permittivity of the plurality of relative permittivities.

Clause 3. The dielectric lens of clause 2, wherein z is equal to a component length of r from the center portion projected along the central axis.

Clause 4. The dielectric lens of clause 2, wherein N is related to a frequency associated with the GRIN lens.

Clause 5. The dielectric lens of clause 2, wherein the plurality of relative permittivities include a continuous range of relative permittivities.

Clause 6. The dielectric lens of clause 1, wherein the first monolithic spoke portion has a first width at a first distance from the center portion and a second width at a second distance from the center portion, wherein the second distance is greater than the first distance, and wherein the first width is different than the second width.

Clause 7. The dielectric lens of clause 6, wherein the second width is greater than the first width, and wherein the at least first monolithic spoke portion of the plurality of spoke portions has a tapered profile that increases in width as a function of distance from the center portion.

Clause 8. The dielectric lens of clause 6, wherein the second width is less than the first width, and wherein the at least first monolithic spoke portion of the plurality of spoke portions has a tapered profile that decreases in width as a function of distance from the center portion.

Clause 9. The dielectric lens of clause 6, wherein the first monolithic spoke portion further has a third width at a third distance from the center portion, the third distance greater than the second distance, wherein the second width is greater than the first width and is greater than the third width, and wherein the first monolithic spoke portion has a dual-tapered profile that increases in width as a function of distance from the center portion until a particular distance from the center portion and then decreases in width as a function of distance from the center portion.

Clause 10. The dielectric lens of clause 6, wherein the first monolithic spoke portion further has a third width at a third distance from the center portion, the third distance greater than the second distance, wherein the second width is less than the first width and is less than the third width, and wherein the first monolithic spoke portion has a reverse dual-tapered profile that decreases in width as a function of distance from the center portion until a particular distance from the center portion and then increases in width as a function of distance from the center portion.

Clause 11. The dielectric lens of clause 1, wherein the plurality of cavity regions includes at least a first monolithic cavity region extending from the center portion to the spherical perimeter region, wherein the first monolithic cavity region has a first width at a first distance from the center portion and a second width at a second distance from the center portion, the second distance greater than the first distance, and wherein the first width is different than the second width.

Clause 12. The dielectric lens of clause 11, wherein the second width is greater than the first width, and wherein the at least first monolithic spoke portion of the plurality of spoke portions has a tapered profile that increases in width as a function of distance from the center portion.

Clause 13. The dielectric lens of clause 11, wherein the second width is less than the first width, and wherein the at least first monolithic spoke portion of the plurality of spoke portions has a tapered profile that decreases in width as a function of distance from the center portion.

Clause 14. The dielectric lens of clause 1, wherein the GRIN lens is further configured to focus electromagnetic radiation to transmit or to receive a far-field high-gain signal.

Clause 15. The dielectric lens of clause 1, further comprising an antenna configured to transmit or to receive an electromagnetic signal through the GRIN lens.

Clause 16. The dielectric lens of clause 1, wherein the spherical perimeter region is a hemisphere.

Clause 17. The dielectric lens of clause 1, wherein the spherical perimeter region is a sphere.

Clause 18. The dielectric lens of clause 1, wherein the dielectric lens is a Maxwell fisheye lens.

Clause 19. The dielectric lens of clause 18, wherein each spoke portion of the plurality of spoke portions is constructed of a material that includes a width, a height (z), and a length along a radius (r) extending from the center portion, wherein the width is equal to a numerical expression defined as $$\frac{2\pi r(z^4 + 2z^2(r^2 + R_{max}^2) + r^4 + 2r^2R_{max}^2 - (\varepsilon_{rel} - 1)R_{max}^2)}{N(\varepsilon_{rel} - 1)(z^2 + r^2 - R_{max}^2)^2},$$

wherein $R_{max}$ is equal to an outer radius of the GRIN lens at the spherical perimeter region, N is equal to a number of spoke portions in the plurality of spoke portions, and $\varepsilon_{rel}$ is a relative permittivity of the plurality of relative permittivities.

Clause 20. The dielectric lens of clause 19, wherein z is equal to a component length of r from the center portion projected along the central axis and wherein N is related to a frequency associated with the GRIN lens.

Clause 21. The dielectric lens of clause 1, wherein the spherical perimeter region is a sphere.

Clause 22. The dielectric lens of clause 1, wherein the at least first monolithic spoke portion extends along a spoke axis from the center portion that is normal to the central axis and twists along the spoke axis.

Clause 23. The dielectric lens of clause 1, wherein the dielectric lens is manufactured utilizing a three-dimensional printing method.

Clause 24. A dielectric lens comprising: a center portion that extends along a cylinder having a central axis; and a plurality of spoke layers wherein each spoke layer of the plurality of spoke layers is attached to another spoke layer of the plurality of spoke layers in a stack-up fashion along the cylinder and each spoke layer comprises: a plurality of spoke portions that are attached to the cylinder and extend to a spherical perimeter region in a radial direction from the cylinder, wherein the plurality of spoke portions includes at least a first monolithic spoke portion extending from the cylinder to the spherical perimeter region, wherein the cylinder and the plurality of spoke portions define a plurality of cavity regions among the plurality of spoke portions, and wherein the cylinder, the plurality of spoke portions, and the plurality of cavity regions are included in a gradient index (GRIN) lens having a plurality of relative permittivities that are based on a radial distance from the center portion.

Clause 25. The dielectric lens of clause 24, wherein the dielectric lens is a Luneburg lens, each spoke portion of the plurality of spoke portions is constructed of a material that includes a width, a height (z), and a length along a radius (r) extending from the cylinder, the width is equal to a numerical expression defined as $$\frac{2\pi r(z^2 + r^2 - R_{max}^2)}{NR_{max}^2(\varepsilon_{rel} - 1)},$$

and
wherein $R_{max}$ is equal to an outer radius of the GRIN lens at the spherical perimeter region, N is equal to a number of spoke portions in the plurality of spoke portions, and $\varepsilon_{rel}$ is a relative permittivity of the plurality of relative permittivities.

Clause 26. The dielectric lens of clause 25, wherein z is equal to a height of a spoke layer of the plurality of spoke layers.

Clause 27. The dielectric lens of clause 25, wherein N is related to a frequency associated with the GRIN lens.

Clause 28. The dielectric lens of clause 25, wherein the plurality of relative permittivities include a continuous range of relative permittivities.

Clause 29. The dielectric lens of clause 24, wherein the first monolithic spoke portion has a first width at a first distance from the cylinder and a second width at a second distance from the cylinder, the second distance greater than the first distance, and wherein the first width is different than the second width.

Clause 30. The dielectric lens of clause 29, wherein the second width is greater than the first width, and wherein the at least first monolithic spoke portion has a tapered profile that increases in width as a function of distance from the cylinder.

Clause 31. The dielectric lens of clause 29, wherein the second width is less than the first width, and wherein the at least first monolithic spoke portion has a tapered profile that decreases in width as a function of distance from the cylinder.

Clause 32. The dielectric lens of clause 29, wherein the first monolithic spoke portion further has a third width at a third distance from the cylinder, the third distance greater than the second distance, wherein the second width is greater than the first width and is greater than the third width, and wherein the first monolithic spoke portion has a dual-tapered profile that increases in width as a function of distance from the cylinder until a particular distance from the cylinder and then decreases in width as a function of distance from the cylinder.

Clause 33. The dielectric lens of clause 29, wherein the first monolithic spoke portion further has a third width at a third distance from the cylinder, the third distance greater than the second distance, wherein the second width is less than the first width and is less than the third width, and wherein the first monolithic spoke portion has a reverse dual-tapered profile that decreases in width as a function of distance from the cylinder until a particular distance from the cylinder and then increases in width as a function of distance from the cylinder.

Clause 34. The dielectric lens of clause 24, wherein the plurality of cavity regions includes at least a first monolithic cavity region extending from the cylinder to the spherical perimeter region, wherein the first monolithic cavity region has a first width at a first distance from the cylinder and a second width at a second distance from the cylinder, the second distance greater than the first distance, and wherein the first width is different than the second width.

Clause 35. The dielectric lens of clause 34, wherein the second width is greater than the first width, and wherein the at least first monolithic spoke portion of the plurality of spoke portions has a tapered profile that increases in width as a function of distance from the cylinder.

Clause 36. The dielectric lens of clause 34, wherein the second width is less than the first width, and wherein the at least first monolithic spoke portion of the plurality of spoke portions has a tapered profile that decreases in width as a function of distance from the cylinder.

Clause 37. The dielectric lens of clause 24, wherein the GRIN lens is further configured to focus electromagnetic radiation to transmit or to receive a far-field high-gain signal.

Clause 38. The dielectric lens of clause 24, further comprising an antenna configured to transmit or to receive an electromagnetic signal through the GRIN lens.

Clause 39. The dielectric lens of clause 24, wherein the spherical perimeter region is a hemisphere.

Clause 40. The dielectric lens of clause 24, wherein the spherical perimeter region is a sphere.

Clause 41. The dielectric lens of clause 24, wherein the dielectric lens is a Maxwell fisheye lens.

Clause 42. The dielectric lens of clause 41, wherein each spoke portion of the plurality of spoke portions is constructed of a material that includes a width, a height (z), and a length along a radius (r) extending from the cylinder, wherein the width is equal to a numerical expression defined as $$\frac{2\pi r(z^4 + 2z^2(r^2 + R_{max}^2) + r^4 + 2r^2 R_{max}^2 - (\varepsilon_{rel} - 1)R_{max}^2)}{N(\varepsilon_{rel} - 1)(z^2 + r^2 - R_{max}^2)^2},$$

wherein $R_{max}$ is equal to an outer radius of the GRIN lens at the spherical perimeter region, N is equal to a number of spoke portions in the plurality of spoke portions, and $\varepsilon_{rel}$ is a relative permittivity of the plurality of relative permittivities.

Clause 43. The dielectric lens of clause 42, wherein z is equal to a component length of r from the center portion projected along the central axis and wherein N is related to a frequency associated with the GRIN lens.

Clause 44. The dielectric lens of clause 24, wherein the at least first monolithic spoke portion extends along a spoke axis from the cylinder that is normal to the central axis and twists along the spoke axis.

Clause 45. The dielectric lens of clause 24, wherein the dielectric lens is manufactured utilizing a three-dimensional printing method.

To the extent that terms "includes," "including," "has," "contains," and variants thereof are used herein, such terms are intended to be inclusive in a manner similar to the term "comprises" as an open transition word without precluding any additional or other elements. Moreover, conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

What is claimed:

1. A dielectric lens comprising:
a center portion that extends along a cylinder having a central axis; and
a plurality of spoke portions that are attached to the center portion and extend to a spherical perimeter region in a radial direction from the center portion,
wherein the plurality of spoke portions includes at least a first monolithic spoke portion extending from the center portion to the spherical perimeter region,
wherein the center portion and the plurality of spoke portions define a plurality of cavity regions among the plurality of spoke portions,
wherein the center portion, the cylinder, the plurality of spoke portions, and the plurality of cavity regions are included in a gradient index (GRIN) lens having a plurality of relative permittivities that are based on a radial distance from the center portion,
wherein each spoke portion of the plurality of spoke portions is constructed of a material that includes a width, a height (z), and a length along a radius (r) extending from the center portion,
wherein the dielectric lens is a Luneburg lens or a Maxwell fisheye lens,
wherein for the Luneburg lens, the width is equal to a numerical expression defined as $$\frac{2\pi r(z^2 + r^2 - R_{max}^2)}{NR_{max}^2(\varepsilon_{rel} - 1)},$$

wherein for the Maxwell fisheye lens, the width is equal to a numerical expression defined as $$\frac{2\pi r(z^4 + 2z^2(r^2 + R_{max}^2) + r^4 + 2r^2 R_{max}^2 - (\varepsilon_{rel} - 1)R_{max}^4)}{N(\varepsilon_{rel} - 1)(z^2 + r^2 - R_{max}^2)^2},$$

wherein $R_{max}$ is equal to an outer radius of the GRIN lens at the spherical perimeter region, N is equal to a number of spoke portions in the plurality of spoke portions, and $\varepsilon_{rel}$ is a relative permittivity of the plurality of relative permittivities,
wherein the height z is equal to a component length of r from the center portion projected along the central axis, and
wherein N is related to a frequency associated with the GRIN lens.

2. The dielectric lens of claim 1, wherein the dielectric lens is the Luneburg lens.

3. The dielectric lens of claim 2, wherein the plurality of relative permittivities include a continuous range of relative permittivities.

4. The dielectric lens of claim 1,
wherein the first monolithic spoke portion has a first width at a first distance from the center portion and a second width at a second distance from the center portion,
wherein the second distance is greater than the first distance, and
wherein the first width is different than the second width.

5. The dielectric lens of claim 4,
wherein the second width is greater than the first width, and
wherein the at least first monolithic spoke portion of the plurality of spoke portions has a tapered profile that increases in width as a function of distance from the center portion.

6. The dielectric lens of claim 4,
wherein the second width is less than the first width, and
wherein the at least first monolithic spoke portion of the plurality of spoke portions has a tapered profile that decreases in width as a function of distance from the center portion.

7. The dielectric lens of claim 4,
wherein the first monolithic spoke portion further has a third width at a third distance from the center portion, the third distance greater than the second distance,
wherein the second width is greater than the first width and is greater than the third width, and
wherein the first monolithic spoke portion has a dual-tapered profile that increases in width as a function of distance from the center portion until a particular distance from the center portion and then decreases in width as a function of distance from the center portion.

8. The dielectric lens of claim 4,
wherein the first monolithic spoke portion further has a third width at a third distance from the center portion, the third distance greater than the second distance,
wherein the second width is less than the first width and is less than the third width, and
wherein the first monolithic spoke portion has a reverse dual-tapered profile that decreases in width as a function of distance from the center portion until a particular distance from the center portion and then increases in width as a function of distance from the center portion.

9. The dielectric lens of claim 1, wherein the spherical perimeter region is either a sphere or a hemisphere.

10. The dielectric lens of claim 1, wherein the dielectric lens is the Maxwell fisheye lens.

11. The dielectric lens of claim 1, wherein the dielectric lens is manufactured utilizing a three-dimensional printing method.

12. A dielectric lens comprising:
a center portion that extends along a cylinder having a central axis; and
a plurality of spoke layers wherein
each spoke layer of the plurality of spoke layers is attached to another spoke layer of the plurality of spoke layers in a stack-up fashion along the cylinder and each spoke layer comprises:
a plurality of spoke portions that are attached to the cylinder and extend to a spherical perimeter region in a radial direction from the cylinder,
wherein the plurality of spoke portions includes at least a first monolithic spoke portion extending from the cylinder to the spherical perimeter region,
wherein the cylinder and the plurality of spoke portions define a plurality of cavity regions among the plurality of spoke portions, and
wherein the cylinder, the plurality of spoke portions, and the plurality of cavity regions are included in a gradient index (GRIN) lens having a plurality of relative permittivities that are based on a radial distance from the center portion,
wherein each spoke portion of the plurality of spoke portions is constructed of a material that includes a width, a height (z), and a length along a radius (r) extending from the cylinder,
wherein the dielectric lens is a Luneburg lens or a Maxwell fisheye lens,
wherein for the Luneburg lens, the width is equal to a numerical expression defined as $$\frac{2\pi r(z^2 + r^2 - R_{max}^2)}{NR_{max}^2(\varepsilon_{rel} - 1)},$$

wherein for the Maxwell fisheye lens, the width is equal to a numerical expression defined as $$\frac{2\pi r(z^4 + 2z^2(r^2 + R_{max}^2) + r^4 + 2r^2 R_{max}^2 - (\varepsilon_{rel} - 1)R_{max}^2)}{N(\varepsilon_{rel} - 1)(z^2 + r^2 - R_{max}^2)^2},$$

wherein $R_{max}$ is equal to an outer radius of the GRIN lens at the spherical perimeter region, N is equal to a number of spoke portions in the plurality of spoke portions, and $\varepsilon_{rel}$ is a relative permittivity of the plurality of relative permittivities,
wherein for the Luneburg lens, z is equal to a height of a spoke layer of the plurality of spoke layers, and for the Maxwell fisheye lens, z is equal to a component length of r from the center portion projected along the central axis, and
wherein N is related to a frequency associated with the GRIN lens.

13. The dielectric lens of claim 12, wherein the dielectric lens is the Luneburg lens.

14. The dielectric lens of claim 13, wherein the plurality of relative permittivities include a continuous range of relative permittivities.

15. The dielectric lens of claim 12,
wherein the first monolithic spoke portion has a first width at a first distance from the cylinder and a second width at a second distance from the cylinder, the second distance greater than the first distance, and
wherein the first width is different than the second width.

16. The dielectric lens of claim 15,
wherein the second width is greater than the first width, and wherein the at least first monolithic spoke portion has a tapered profile that increases in width as a function of distance from the cylinder.

17. The dielectric lens of claim 15,
wherein the second width is less than the first width, and
wherein the at least first monolithic spoke portion has a tapered profile that decreases in width as a function of distance from the cylinder.

18. The dielectric lens of claim 15,
wherein the first monolithic spoke portion further has a third width at a third distance from the cylinder, the third distance greater than the second distance,
wherein the second width is greater than the first width and is greater than the third width, and
wherein the first monolithic spoke portion has a dual-tapered profile that increases in width as a function of distance from the cylinder until a particular distance from the cylinder and then decreases in width as a function of distance from the cylinder.

19. The dielectric lens of claim 15,
wherein the first monolithic spoke portion further has a third width at a third distance from the cylinder, the third distance greater than the second distance,
wherein the second width is less than the first width and is less than the third width, and
wherein the first monolithic spoke portion has a reverse dual-tapered profile that decreases in width as a function of distance from the cylinder until a particular distance from the cylinder and then increases in width as a function of distance from the cylinder.

20. The dielectric lens of claim 12, wherein the spherical perimeter region is a sphere or a hemisphere.

21. The dielectric lens of claim 12, wherein the dielectric lens is the Maxwell fisheye lens.

22. The dielectric lens of claim 12, wherein the at least first monolithic spoke portion extends along a spoke axis from the cylinder that is normal to the central axis and twists along the spoke axis.

23. The dielectric lens of claim 12, wherein the dielectric lens is manufactured utilizing a three-dimensional printing method.

24. A dielectric lens comprising:
a center portion that extends along a cylinder having a central axis; and
a plurality of spoke portions that are attached to the center portion and extend to a spherical perimeter region in a radial direction from the center portion,
wherein the plurality of spoke portions includes at least a first monolithic spoke portion extending from the center portion to the spherical perimeter region,
wherein the center portion and the plurality of spoke portions define a plurality of cavity regions among the plurality of spoke portions,
wherein the center portion, the cylinder, the plurality of spoke portions, and the plurality of cavity regions are included in a gradient index (GRIN) lens having a plurality of relative permittivities that are based on a radial distance from the center portion, and
wherein the at least first monolithic spoke portion extends along a spoke axis from the center portion that is normal to the central axis and twists along the spoke axis.

* * * * *